United States Patent
Jones et al.

(10) Patent No.: US 10,472,234 B2
(45) Date of Patent: *Nov. 12, 2019

(54) METHOD OF PRODUCING HYDROGEN

(71) Applicant: THE SCIENCE AND TECHNOLOGY FACILITIES COUNCIL, Oxfordshire (GB)

(72) Inventors: Martin Owen Jones, Oxford (GB); William Ian Fraser David, Abingdon (GB); Joshua William Makepeace, Oxford (GB)

(73) Assignee: UNITED KINGDOM RESEARCH AND INNOVATION, Swindon (GB)

(*) Notice: Subject to any disclaimer, the term of this patent is extended or adjusted under 35 U.S.C. 154(b) by 701 days.

This patent is subject to a terminal disclaimer.

(21) Appl. No.: 15/025,843

(22) PCT Filed: Sep. 30, 2014

(86) PCT No.: PCT/GB2014/052954
§ 371 (c)(1),
(2) Date: Mar. 29, 2016

(87) PCT Pub. No.: WO2015/044691
PCT Pub. Date: Apr. 2, 2015

(65) Prior Publication Data
US 2016/0289068 A1 Oct. 6, 2016

(30) Foreign Application Priority Data
Sep. 30, 2013 (GB) .................. 1317298.6

(51) Int. Cl.
*C01B 3/04* (2006.01)
*C01B 3/08* (2006.01)
*C01B 21/08* (2006.01)
*H01M 8/0606* (2016.01)
*H01M 8/1018* (2016.01)
*F02B 43/10* (2006.01)

(52) U.S. Cl.
CPC .............. *C01B 3/047* (2013.01); *F02B 43/10* (2013.01); *H01M 8/0606* (2013.01); *H01M 8/1018* (2013.01); *H01M 2008/1095* (2013.01); *H01M 2300/0082* (2013.01)

(58) Field of Classification Search
CPC ........... C01B 3/047; C01B 3/08; C01B 21/08; Y02E 60/364; F02B 43/10; H01M 8/0606; H01M 8/1018
See application file for complete search history.

(56) References Cited

U.S. PATENT DOCUMENTS

| 1,646,372 | A | * | 10/1927 | Wait ....................... C01B 3/08 |
| | | | | 423/413 |
| 7,640,896 | B2 | * | 1/2010 | Nazri ..................... C01B 3/047 |
| | | | | 123/198 A |
| 2009/0291040 | A1 | | 11/2009 | Tange et al. |

FOREIGN PATENT DOCUMENTS

| CN | 102489308 A | 6/2012 |
| WO | WO-2013/057473 A1 | 4/2013 |

* cited by examiner

*Primary Examiner* — Amber R Orlando
*Assistant Examiner* — Syed T Iqbal
(74) *Attorney, Agent, or Firm* — Birch, Stewart, Kolasch & Birch, LLP

(57) ABSTRACT

The present invention relates to a method of producing hydrogen from ammonia, and in particular a method of producing hydrogen from ammonia for use in a fuel cell and/or in a prime mover. The method may be carried out in-situ in a vehicle. The invention also relates to an apparatus for producing hydrogen from ammonia.

34 Claims, 16 Drawing Sheets

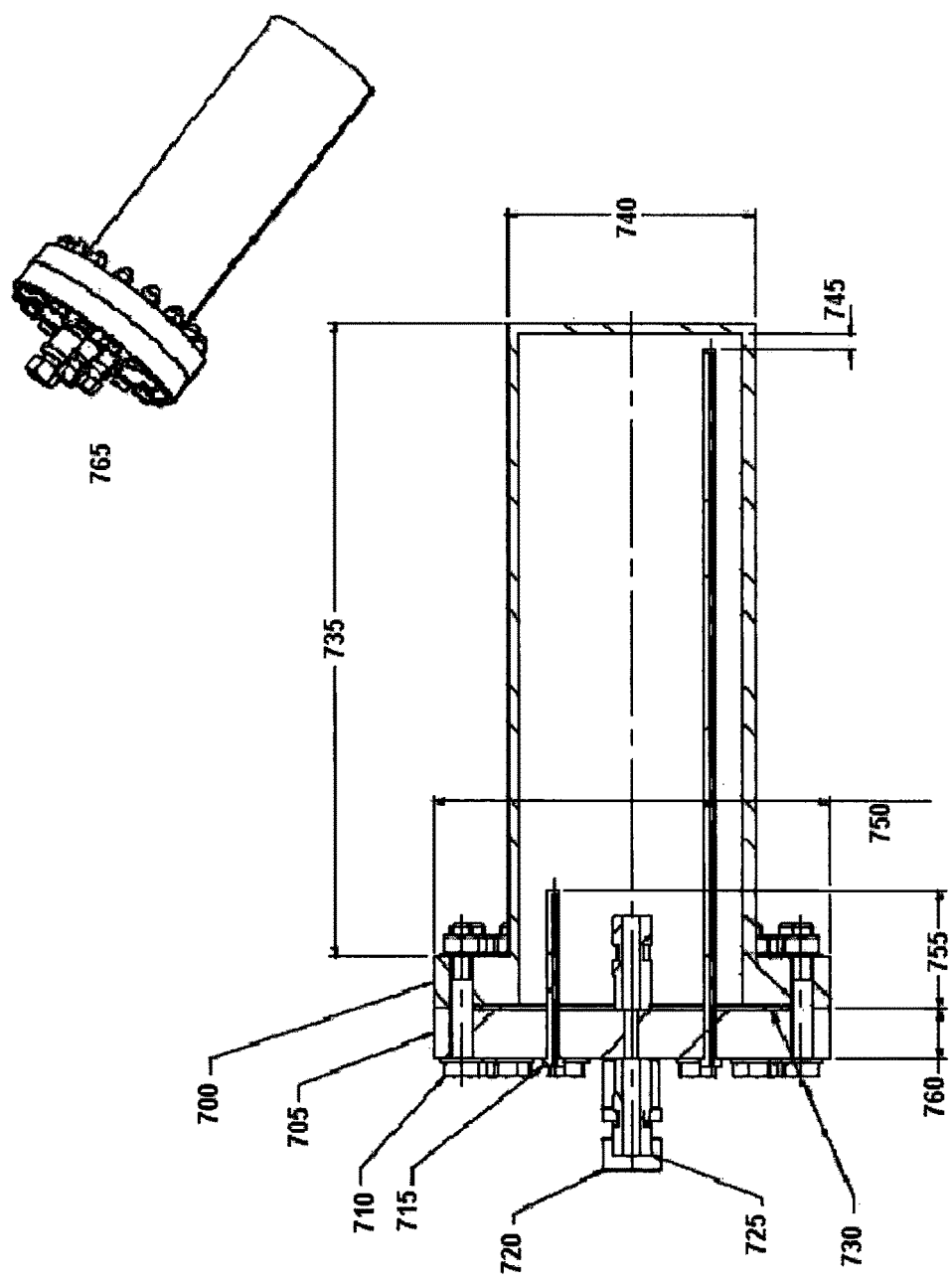
Figure 12
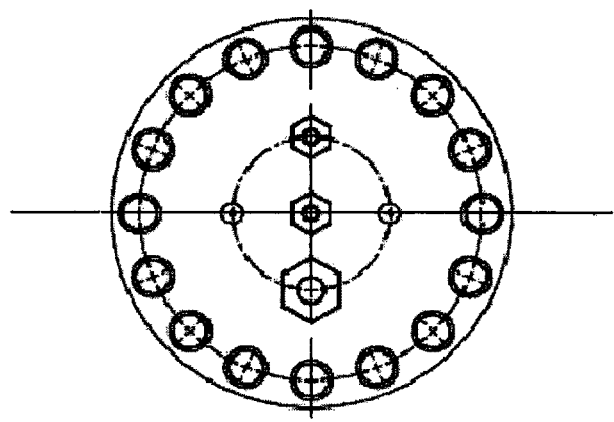

METHOD OF PRODUCING HYDROGEN

The present invention relates to a method of producing hydrogen from ammonia, and in particular a method of producing hydrogen from ammonia for use in a fuel cell and/or in a prime mover. The method may be carried out in-situ in a vehicle.

While the precise timescales about the future of energy provision from oil, coal and gas are uncertain and strongly debated, it is unsustainable that fossil fuels can be relied on as sources of energy. Fossil fuels are currently being consumed at a rate that is in excess of a million times faster than their formation. It is also clear that the amount of carbon dioxide released into the atmosphere has a significant and man-made component.

Transportation is one of the principal energy sectors and depends almost entirely on fossil fuels for energy provision. It is recognised that a move from petrol and diesel to liquid petroleum (LPG) and then to compressed natural gas (CNG) will result in lower $CO_2$ emissions. The two main technologies which may replace the internal combustion engine over the first half of this century are batteries and fuel cells. The move away from a solely fossil-fuel system for transportation has already begun and gasoline/diesel-battery hybrids now form a small, but increasing component of the car market.

Hydrogen storage is one of the main scientific and technological challenges in the move towards the mass production of hydrogen fuel-cell electric vehicles and for the move towards a low-carbon economy. Multiple criteria must be satisfied: storage must not only be lightweight and compact, but also safe, inexpensive, long-range and, ideally, rapidly refuellable.

Significant issues have arisen in the search for improved solid-state hydrogen storage materials; for example, facile reversibility has been a major challenge for many complex hydrides studies, whilst physisorption in porous structures is still restricted to cryogenic temperatures. Although there has been a very significant research effort in solid-state hydrogen storage, high pressure gas storage combined with conventional metal hydrides is still seen as the current intermediate-term candidate for car manufacturers.

On-site generation of hydrogen has been considered for use in a fuel cell. The hydrogen may be formed, for example, from methanol and/or methane. However, hydrogen formation from methanol and/or methane inevitably leads to carbon dioxide and/or carbon monoxide emissions. Hydrogen formation from methanol and/or methane has other associated disadvantages such as the requirement for secondary tanks of water and coking of reformation catalysts.

WO2013/057473 relates to a method of producing hydrogen from ammonia, and in particular a method of producing hydrogen from ammonia by reacting it with a metal and/or metal-containing-compound. Particularly advantageous results are obtained via the reaction of sodium metal with ammonia to produce hydrogen.

It is one object of the present invention to overcome or address the problems of prior art hydrogen storage and hydrogen production for use in a fuel cell or in a prime mover or to at least provide a commercially useful alternative thereto. It is an alternative and/or additional object to provide a method for producing hydrogen for use in a fuel cell or in a prime mover which is cheaper to make and/or more effective than known methods.

In the first aspect of the present invention there is provided a method of producing hydrogen from ammonia, the method comprising:

(i) providing ammonia as a fuel source;
(ii) introducing ammonia into a reactor;
(iii) contacting at least some of the ammonia in the reactor with a metal-containing-compound to form hydrogen;
(iv) removing at least some of the hydrogen formed in step (iii); and
(v) contacting the metal-containing-compound with further ammonia;
   wherein the metal-containing-compound comprises one or more of Li, Be, Mg, Ca, Sr, Ba or alloys or mixtures of two or more thereof; and
   wherein the metal-containing-compound is selected from a metal amide, metal imide, metal nitride or combinations thereof.

The present invention will now be further described. In the following passages different aspects of the invention are defined in more detail. Each aspect so defined may be combined with any other aspect or aspects unless clearly indicated to the contrary. In particular any feature indicated as being preferred or advantageous may be combined with any other feature or features indicated as being preferred or advantageous.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

The method described herein uses ammonia, which is preferably in the gaseous and/or liquid state as a fuel source and in particular as a source of hydrogen. Ammonia has a number of favourable attributes for use as a hydrogen storage material. It has a high capacity for hydrogen storage, 17.65 wt % based on its molecular structure. It can be liquefied under mild conditions. The vapour pressure of ammonia at room temperature is 9.2 bar and its physical properties are similar to propane. However, to date, several considerations have prevented its successful use in hydrogen production in vehicles on a commercial scale. These considerations include safety and toxicity issues, both actual and perceived. Moreover, in order to release hydrogen from ammonia, significant energy input is required.

WO2013/057473 relates to a method of producing hydrogen from ammonia, and in particular a method of producing hydrogen from ammonia by reacting it with a one more of a broad range of metals and/or metal-containing-compounds. Particularly advantageous results are obtained via the reaction of sodium metal with ammonia to produce hydrogen. The present inventors have now surprisingly found that equivalent or superior results of producing hydrogen from ammonia may be achieved by the reaction of ammonia with a metal-containing-compound, wherein the metal-containing-compound comprises one or more of Li, Be, Mg, Ca, Sr, Ba or alloys or mixtures of two or more thereof and wherein the metal-containing-compound is selected from a metal amide, metal imide, metal nitride or combinations thereof. None of the preferred embodiments or examples of WO2013/057473 is directed to the subject matter of the present invention as discussed above.

Advantageously, the metal-containing-compound of the present invention can be recycled through the process enabling further ammonia to be converted to hydrogen.

Without wishing to be bound by theory, it is thought that the metal amide, metal imide, metal nitride or combination thereof is a reactant which reacts with ammonia to form one or more intermediates and is then regenerated so that it can react with further ammonia. The one or more intermediates may include different chemical compounds. Alternately, the one or more intermediates may comprise a metal amide/imide/nitride-ammonia adduct in which ammonia may be polarised such that decomposition into nitrogen and hydrogen is promoted. Therefore, the metal-containing-compound does not simply act as a catalyst.

The overall reaction may be represented by the chemical equation:

$$wNH_3 + MCC = MCC + xN_2 + yH_2.$$

Where MCC is a metal-containing compound, being a metal amide and/or imide and/or nitride or combinations thereof, and w, x, and y are numerical values corresponding to an appropriate stoichiometric reaction.

When the metal-containing-compound is a metal imide, the decomposition reactions are thought to be as follows:

$$2NH_3 + M_2NH \rightarrow M_2NH + N_2 + 3H_2 \text{ (where M=Li)}$$

$$2NH_3 + M(NH) \rightarrow M(NH) + N_2 + 3H_2 \text{ (where M=Be, Mg, Ca, Sr, Ba)}$$

It will be understood that the term 'metal imide' includes stoichiometric or non-stoichiometric imides. For example, the term 'metal imide' includes imides of the chemical formulae $M_{(3-a)}NH_a$ where $1 \leq a < 2$ when M is Li and $M(NH_b)_b$ where $1 \leq b < 2$ when M=Be, Mg, Ca, Sr, Ba. Preferably, $1 \leq a < 1.8$ or $1 \leq a < 1.6$, or $1 \leq a < 1.4$, or $1 \leq a < 1.2$ when M is Li. Preferably, $1 \leq b < 1.8$ or $1 \leq b < 1.6$, or $1 \leq b < 1.4$, or $1 \leq b < 1.2$ when M=Be, Mg, Ca, Sr, Ba.

Preferably the method described herein is carried out in-situ in a vehicle. Preferably, it is carried out in a hybrid vehicle.

Advantageously, the invention relates to a method of cracking ammonia at temperatures that are lower than those currently employed in the industry, preferably with a cheaper activating agent which preferably does not poison with time. In one embodiment, the invention relates to a method wherein hydrogen is provided at the point of use. Alternatively, and/or additionally, hydrogen may be produced at a site remote from use and optionally said hydrogen may be introduced into a distributed network.

The term 'distributed network' may refer to a power network which is connected to at least one distributed generation plant or a distributed energy resource system. The distributed generation plants and/or distributed energy resource systems may be small-scale power generation facilities which may generate in the range of from 3 kW to 10,000 kW of power and may be used to provide an alternative to and/or an enhancement of a traditional electric power system.

The method described herein may further comprise introducing at least some of the hydrogen removed into a transport and/or storage means. The storage means may comprise any suitable container, for example, a cylinder. The transport means may comprise a pipe or network for delivery of the hydrogen, for example, to a desired end point.

Preferably the method described herein is carried out in conjunction with a fuel cell and/or prime mover and/or combustion engine, preferably an ammonia internal combustion engine, for any applications including heat and power applications, backup generator electricity, consumer electronics and large scale high demand electricity users. Preferably the method provides a means of providing hydrogen at source from ammonia for any application requiring hydrogen including applications in chemical industry, semiconductor industry, petrochemical industry, petroleum industry, energy industry or any process that utilises or requires hydrogen gas where hydrogen is stored as ammonia and converted to hydrogen as required.

The term 'prime-mover' may refer to a machine that transforms energy (for example thermal or electrical energy) into mechanical power. For example, a prime-mover may refer to an engine or a turbine.

Preferably the method described herein is carried out in conjunction with a fuel cell or prime-mover or combustion engine, preferably an ammonia internal combustion engine, for any application including the delivery of hydrogen to a fuel cell to provide electricity for systems not connected or disconnected from the national grid, including rural and/or isolated applications such as street lighting, traffic lights, backup power supplies and for heat and power provision for domestic applications such as household appliances. In one embodiment, the backup power supplies are for use in hospitals or data centres. Suitable household appliances include boilers, ovens, refrigerators, washing machines, dishwashers, lighting and computers.

Preferably the method described herein may provide continuous generation of hydrogen in large quantities where hydrogen supply is essential and/or where delivery to and storage of ammonia in industrial locations is possible and subsequent conversion or partial conversion of ammonia to hydrogen may be undertaken in order to ensure high hydrogen capacity on-site.

Preferably, the method described herein further comprises introducing the removed hydrogen and/or partially converted ammonia into a fuel cell or a prime mover or a combustion engine, preferably an ammonia internal combustion engine. Optionally the removed hydrogen may be passed through a filter to remove any ammonia present. The filter may comprise a group 1, group 2, and/or transition metal halide and/or a group 1, group 2, and/or transition metal borohydride and/or a solid state ammonia/hydrogen filter. Optionally, the hydrogen and ammonia may be separated by physical methods of separation, for example by changing the temperature and/or the pressure. Suitable materials may be selected and tailored depending on the temperature of operation, mass, filter capacity and/or efficiency.

Optionally the removed hydrogen may be circulated through the reactor to increase the ammonia conversion rate, passed through additional reactors in series or parallel to enhance ammonia conversion and/or hydrogen purity and/or to achieve specifically desired ammonia:hydrogen ratios for combustion, fuel cell, prime-mover, chemical or other purposes (see above).

The hydrogen produced in the present invention may be used in any suitable fuel cell, for example in a PEM (proton exchange membrane) fuel cell or other fuel cell known in the art. Partially converted ammonia may be used in a fuel cell or a prime mover or a combustion engine, preferably an ammonia internal combustion engine.

The method described herein may further comprise combusting the removed hydrogen. For example the removed hydrogen may be combusted directly in a suitably modified internal combustion engine, or utilised with ammonia in an ammonia internal combustion engine.

Ammonia is provided as a fuel source. Ammonia may be provided in a gaseous and/or liquid state. Suitable conditions for storing liquid and gaseous ammonia are known in the art. Typically the ammonia will be anhydrous. Ammonia may be stored under pressure, cryogenically and/or in a solid state store. The ammonia may be stored in a remote reservoir and transferred into the reactor either as a liquid, for example as a pressurised liquid, or a gas, for example a high pressure gas. When stored as a pressurised gas, preferably the ammonia is stored at from 0.05 to 10 MPa, more preferably from 0.1 to 1 MPa.

Ammonia may be introduced into the reactor by injection, pumping, spraying and/or by mechanical means. Preferably the ammonia is introduced by pumping or spraying means. Ammonia may be introduced directly into the reactor to contact the metal-containing-compound and/or bubbled through the metal-containing-compound when the metal-containing-compound is in molten (liquid) form. Preferably ammonia is introduced as a heated gas.

Preferably the metal-containing-compound is regenerated prior to contacting the metal-containing-compound with further ammonia (step (v)).

Preferably, the metal-containing-compound comprises one or more of Li, Mg, Be, Ca, Sr, Ba or alloys or mixtures of two or more thereof. Alternately, preferably, the metal-containing-compound comprises one or more of Li, Be, Ca, Sr, Ba or alloys or mixtures of two or more thereof. These metals are advantageous because the reaction of amides, imides or nitrides of these metals with ammonia to produce hydrogen occurs at an equivalent efficiency at a lower temperature, for example 50° C. lower, than corresponding amides, imides and nitrides of sodium. This reduces the energy required to heat the reactor to obtain the same amount of hydrogen. Furthermore, amides, imides and nitrides of Li, Mg, Be, Ca, Sr, Ba or alloys or mixtures of two or more thereof are less volatile than amides, imides or nitrides of sodium, therefore the process is more efficient because less metal-containing-compound is lost through the reactor outlet(s).

Preferably, the metal-containing-compound comprises Li or alloys thereof. This is particularly advantageous because the reaction of lithium amide, lithium imide or lithium nitride with ammonia to produce hydrogen occurs at an equivalent efficiency at a lower temperature, for example 50° C. lower, than corresponding amides, imides and nitrides of sodium. This reduces the energy required to heat the reactor to obtain the same amount of hydrogen.

Without wishing to be bound by theory, it is thought that lithium amide ($LiNH_2$) is first partially or completely converted to lithium imide ($Li_2NH$, or a non-stoichiometric material of general formula $Li_{(3-a)}NH_a$ where $1 \leq a < 2$ as described above) at temperatures where it is particularly active in the decomposition of ammonia. Such a mechanism may be advantageous because lithium amide melts at 360° C., which, although significantly higher than the melting point of sodium amide (210° C.), may not completely avoid the difficulties encountered with the effective containment of the metal containing compound. However, lithium imide is solid up to the point of its decomposition at around 600° C., and is therefore thought to be easier to contain within the reaction chamber as the temperature increases. Furthermore, providing the metal-containing-compound in the solid state is also advantageous because a solid is, for example, more amenable to distribution on a solid state host (for example a mesoporous solid), and thus the surface area of the metal containing compound may be maximised. Moreover, the use of lithium amide/imide is significantly cheaper than existing precious metal catalysts, and offers greater ammonia decomposition activity than sodium amide.

In an alternative preferable embodiment, the metal-containing-compound comprises Be, Mg, Ca, Sr, Ba or alloys or mixtures of two or more thereof. Preferably the metal-containing-compound comprises Ca, Mg or alloys or mixtures of two or more thereof. Metal-containing-compounds comprising calcium or magnesium or alloys or mixtures of two or more thereof are also advantageous in the present invention because such compounds are very cheap and readily available, for example, in the form of metal carbonates.

Preferably, the metal-containing-compound comprises calcium. Preferably, the metal-containing-compound comprises lithium and calcium. Preferably, the metal-containing-compound comprises lithium-calcium imide ($Li_2Ca(NH)_2$) and/or calcium imide. Lithium-calcium imide and/or calcium imide may be particularly useful because these compounds are thought to remain solid up to at least 500° C., making it easier to contain the metal-containing-compound within the reaction chamber and increasing recovery for use in multiple ammonia decomposition cycles. Without wishing to be bound by theory, it is thought that lithium-calcium imide advantageously does not form an amide, and so it does not require heating under argon to form a solid imide which enhances recovery of the metal-containing-compound and is more amenable to distribution on a solid state host (e.g. a mesoporous solid), and thus the surface area of the metal-containing-compound may be maximised. These compounds are therefore suitable for application to a practical device. Further, lithium-calcium imide and/or calcium imide may be compatible with support architecture to further improve their activity.

Preferably, the metal-containing-compound is selected from a metal imide or metal nitride or combinations thereof. More preferably the metal-containing-compound is a metal imide.

Imides and/or nitrides of the present invention are particularly favourable because they are less volatile than amides. Thus the efficiency of the reaction is increased and less metal-containing-compound is lost from the reactor during the process.

Preferably, the metal-containing-compound comprises Li; and the metal-containing-compound is selected from a metal imide or metal nitride or combinations thereof. This is particularly advantageous because the reaction of lithium imide and/or lithium nitride with ammonia to produce hydrogen occurs at an equivalent efficiency at a lower temperature than corresponding amides, imides and nitrides of sodium, and lithium imides and/or nitrides are also less volatile. Thus the efficiency of the process is significantly increased.

Preferably, the metal-containing-compound comprises Ca and/or Mg and/or Sr and/or Ba; and the metal-containing-compound is selected from a metal imide or metal nitride or combinations thereof. This is particularly advantageous because the reaction of imides and/or nitrides of Ca and/or Mg and/or Sr and/or Ba with ammonia to produce hydrogen occurs at an equivalent efficiency at a lower temperature than corresponding amides, imides and nitrides of sodium, and imides and/or nitrides of Ca and/or Mg and/or Sr and/or Ba are also less volatile. Thus the efficiency of the process is significantly increased. More preferably, the metal-containing-compound is calcium imide and/or calcium nitride.

Preferably, the metal-containing-compound is provided as a metal imide.

Alternately, the metal-containing-compound is provided by thermally decomposing a metal-containing-compound precursor. In one preferable embodiment, the metal-containing-compound precursor is a metal amide. When the precursor is a metal amide, the precursor preferably decomposes to a metal imide and/or nitride before reacting with the ammonia to produce hydrogen.

The metal-containing-compound may be stored prior to introduction into the reactor and/or provided as a solid, liquid, or dispersed state. The metal-containing-compound may be dispersed in a solvent, for example liquid ammonia. Alternatively and/or additionally the metal-containing-compound may be stored and/or provided dispersed in a solid state host (for example a mesoporous solid).

The metal-containing-compound may be molten under reaction conditions.

Preferably the metal and/or metal-containing-compound is present in an amount of from 0.1 g to 5 kg, more preferably from 0.1 g to 3 kg, or from 0.1 g to 2 kg, or from 0.1 g to 1 kg, or from 0.25 g to 100 g, or from 0.25 g to 50 g, or from 0.25 g to 10 g, most preferably from 1 g to 5 g. Preferably the metal is present in an amount of 5 kg or less, more preferably of 3 kg or less or of 1 kg or less, or of 500 g or less, more preferably 100 g or less, especially for vehicle applications.

Preferably, contacting at least some of the ammonia in the reactor with a metal-containing-compound to form hydrogen (step (iii)) is carried out at a temperature in the range of from −30 to 800° C., or from 0 to 700° C., or from 100 to 600° C., or from 200 to 600° C., or from 300 to 550° C., or from 350 to 500° C. The kinetics of the decomposition of the ammonia are influenced by temperature. Contacting ammonia with the metal-containing-compound at a temperature in the range of from 350° C. to 500° C. increases the percentage conversion of ammonia to hydrogen and increases the rate of the reaction.

More preferably, contacting at least some of the ammonia in the reactor with a metal-containing-compound to form hydrogen (step (iii)) is carried out at a temperature in the range from 400 to 440° C. Within this range, the percentage conversion of ammonia to hydrogen is more favourable to that at a temperature of 400 or 350° C. or less. Furthermore, heating the reactor to a temperature of 440° C. or less requires less energy than heating the reactor to a higher temperature. Still more preferably, contacting at least some of the ammonia in the reactor with a metal-containing-compound to form hydrogen is carried out at a temperature of from 420 to 440° C.

Preferably, contacting at least some of the ammonia in the reactor with a metal-containing-compound to form hydrogen (step (iii)) is carried out at a pressure in the range of from 0.05 to 20 MPa, or from 0.05 to 10 MPa, or from 0.1 to 1 MPa, or from 0.1 to 0.5 MPa, more preferably from 0.1 to 0.2 MPa, most preferably from 0.1 to 0.15 MPa, or from 0.11 to 0.15 MPa. The kinetics of the decomposition of the ammonia may be influenced by pressure. Contacting ammonia with the metal-containing-compound at a pressure of, for example, above 0.1 MPa, may increase or decrease the rate of the reaction and/or the percentage conversion of ammonia to hydrogen.

Preferably, in step (iii) of the method as described herein, at least a portion of the metal-containing-compound is in a solid and/or dispersed form.

Preferably, the ammonia is introduced into the reactor at a temperature in the range of from −30 to 800° C., or from 0 to 700° C., or from 100 to 600° C., or from 200 to 600° C., or from 300 to 550° C., or from 350 to 500° C. The kinetics of the decomposition of the ammonia are influenced by temperature. Introducing ammonia at a temperature in the range of from 350° C. to 500° C. increases the percentage conversion of ammonia to hydrogen and increases the rate of the reaction.

More preferably, the ammonia is introduced into the reactor at a temperature in the range of from 400 to 440° C. Within this temperature range, the percentage conversion of ammonia to hydrogen is more favourable to that at a temperature of 400 or 350° C. or less. Thus introducing the ammonia at a temperature within this favourable range increases the efficiency of the reaction. Furthermore, heating the ammonia to a temperature of 440° C. or less requires less energy than heating the ammonia to a higher temperature. Still more preferably, the ammonia is introduced into the reactor at a temperature of from 420 to 440° C.

Preferably, the ammonia is introduced into the reactor at a pressure in the range of from 0.05 to 20 MPa, or from 0.05 to 10 MPa, or from 0.1 to 1 MPa, or from 0.1 to 0.5 MPa, more preferably from 0.1 to 0.2 MPa, most preferably from 0.1 to 0.15 MPa, or from 0.11 to 0.15 MPa. The kinetics of the reaction to form the intermediate and the decomposition of the same may be influenced by pressure. Introducing ammonia at a pressure of, for example, above 0.1 MPa, may increase or decrease the rate of the reaction and/or the percentage conversion of ammonia to hydrogen.

Ammonia may be introduced into the reactor continuously whilst the reactor is in operation (i.e. whilst the reactor is being used to react at least some of the ammonia with a metal-containing compound to form hydrogen). Ammonia may be introduced into the reactor in a continuous, semi-continuous or in a batch process. Valves and/or controlling means may be used to control the amount of ammonia introduced into the reactor and/or to analyse the amount of ammonia present in the reactor. The controlling means may comprise volumetric or mass flow controllers. Ammonia in the outflow gas may be determined by colour change filter, spectroscopically, electronically, by mass spectroscopy or by mass change (of filter). Valves for fixed volume/mass addition are available commercially.

Preferably, the reactor has a volume in the range of from 0.01 $cm^3$ to 10,000 litres depending upon the application and conversion rate of ammonia required. Multiple reactors of similar or differing volumes may be used in series or parallel to provide pure hydrogen from ammonia conversion or a mixed ammonia/hydrogen gas of variable composition. Preferably the reactor has a volume range of from 0.01 to 10,000 $cm^3$, more preferably from 0.1 $cm^3$ to 1,000 $cm^3$, more preferably in the range of from 1 $cm^3$ to 200 $cm^3$ or from 1 $cm^3$ to 100 $cm^3$, most preferably in the range of from 2 $cm^3$ to 50 $cm^3$, especially for vehicle applications.

The method described herein preferably further comprises refuelling the ammonia fuel source. The ammonia fuel source may be kept in a remote reservoir from where it may be introduced into the reactor. The remote reservoir preferably has a flowline to the reactor for introducing the ammonia into the reactor. One advantage of using ammonia as a fuel source is that refuelling may be carried out quickly (at a similar speed to refuelling a fuel tank with petroleum or diesel). Using ammonia as a fuel source allows on-board refuelling to take place. Moreover, ammonia may be provided at refuelling stations in a similar way to how petroleum and/or diesel is provided today. This has many advantages over other known methods of refuelling alternative energy sources. For example recharging of electric batteries is time consuming and requires specialist equipment which is separate to the vehicle. This is clearly disadvantageous for consumers. Thus the present method has improved consumer acceptability.

Preferably, the at least some ammonia is introduced into the reactor such that at any one time the molar ratio of metal-containing-compound to ammonia is in the range of from 1:1 to 2:1, more preferably in the range of from 1:1 to 1.8:1, more preferably in the range of from 1:1 to 1.6:1, more preferably in the range of from 1:1 to 1.4:1, most preferably in the range of from 1:1 to 1.2:1 The molar ratio of ammonia to metal and/or metal-containing-compound in the reactor may be 1.1:1. Preferably the at least some ammonia is introduced into the reactor such that there is an excess of metal-containing-compound to minimise up-stream ammonia loss.

Preferably, the ammonia is in a gaseous and/or liquid state. Preferably, ammonia is introduced into the reactor by injection, pumping, spraying and/or by mechanical means.

Preferably, the ammonia is introduced in a gaseous state and is introduced at a flow rate of from 1 to 400 sccm, or from 5 to 400 sccm, or from 10 to 200 sccm, more preferably from 20 to 100 sccm, or from 20 to 50 sccm, or from 20 to 60 sccm, or from 30 to 60 sccm, or from 40 to 60 sccm. Preferably the ammonia is introduced at a pressure of 0.1 to 1 MPa, or from 0.1 to 0.2 MPa.

Preferably, the method further comprises refuelling the ammonia fuel source.

In one embodiment, contacting at least some of the ammonia in the reactor with a metal-containing-compound to form hydrogen (step (iii)) is carried out in the absence of a catalyst. This is advantageous because it may improve the economy and simplicity of the production of ammonia.

Alternately, contacting at least some of the ammonia in the reactor with the metal-containing-compound to form hydrogen (step (iii)) is carried out in the presence of a catalyst. Preferably the catalyst comprises one or more transition metals, lanthanide metals and mixtures thereof. More preferably, the catalyst is selected from the group consisting of transition metal calogenides, lanthanide metal calogenides, transition metal halides, lanthanide metal halides, transition metal pnictides, lanthanide metal pnictides, transition metal tetrels, lanthanide metal tetrels and mixtures of two or more thereof. The term 'transition metal tetrels' may refer to compounds of transition metals with one or more of the group 14 elements. The term 'lanthanide metal tetrels' may refer to compounds of lanthanide metals with one or more of the group 14 elements.

One advantage of contacting at least some of the ammonia in the reactor with the metal-containing-compound to form hydrogen (step (iii)) in the presence of a catalyst is that the catalyst may increase the rate of production of hydrogen from ammonia and/or assist in preventing the loss of metal-containing-compound from the reactor.

The method described herein may also comprise the step of introducing the metal-containing-compound and/or a precursor thereof into the reactor.

As outlined above, in the method described herein the metal-containing-compound reacts with ammonia to form nitrogen and hydrogen and regenerate the metal-containing-compound. The regenerated metal-containing-compound is then reacted with further ammonia. In this way, the metal-containing-compound can be recycled through the process enabling further ammonia to be converted to hydrogen.

The metal-containing-compound and/or a precursor thereof may be stored in a remote reservoir and transferred to the reactor. Alternatively and/or additionally the metal-containing-compound and/or a precursor thereof may be kept in the reactor.

The metal-containing-compound and/or a precursor thereof may be introduced into the reactor by pumping (preferably electromotively), volatizing/refluxing, spraying, or is mechanically introduced. Preferably, the metal-containing-compound and/or a precursor thereof is introduced by electromagnetic pumping. It is thought that this method advantageously presents the cleanest reactive surface to the ammonia.

The metal-containing-compound and/or a precursor thereof may be introduced into the reactor in a solid, liquid or dispersed form, preferably at a temperature of from −100° C. to 800° C., more preferably at a temperature of from 0 to 800° C., more preferably at a temperature of from 100 to 700° C., more preferably at a temperature of from 100 to 600° C., or from 100 to 500° C., most preferably at a temperature of from 150 to 500° C., or from 100 to 400° C., or from 150 to 400° C.

Preferably, the metal-containing-compound and/or a precursor thereof is introduced into the reactor in a solid or dispersed form.

When the metal-containing-compound and/or a precursor thereof comprises lithium, the metal-containing-compound and/or a precursor thereof is preferably introduced into the reactor at a temperature of from 100 to 600° C., more preferably from 200 to 500° C., most preferably at a temperature of from 300 to 500° C., or from 380 to 420° C. or from 400 to 440° C.

Preferably, the method further comprises removing hydrogen formed by the contacting of ammonia with the metal-containing-compound from the reactor.

The hydrogen formed is preferably transferred to a fuel cell and/or to a prime mover. Optionally the removed hydrogen may be passed through a filter to remove any ammonia present. The filter may be as described above.

Preferably the reaction of the metal-containing compound and ammonia is carried out in an inert atmosphere. The inert atmosphere may comprise nitrogen, argon and/or helium.

It will be understood that the steps outlined in the described method may be carried out in any suitable order.

The present invention has a number of advantages which are outlined below.

The metal-containing compound which reacts with ammonia to form hydrogen is reformed during the reaction, thus it may be recycled in the process.

Advantageously, the proposed system is simple, relying on a simple reaction which may have one or more intermediates and results in the evolution of hydrogen and optionally nitrogen. Furthermore, the process described herein is energy efficient.

It is advantageous to use metal-containing-compounds comprising lithium metal in the present invention as it is a cheap and abundant metal of considerably reduced cost compared to traditional ammonia cracking catalysts such as ruthenium.

Most solid-state hydrogen storage systems rely on the bulk storage of a complex hydride. In the described process the hydrogen storage medium is ammonia (~18 wt %) which is reacted with a limited mass of a metal containing compound, which, being regenerated part of the decomposition process, may be subsequently reacted with additional ammonia to produce hydrogen. This process is preferably not a catalytic process but a two-step process where the metal and/or metal containing compound is a reactant. In the described process the weight and volume of the reactor may be reduced over known reactors since only relative small masses of metal and/or metal containing compounds and ammonia need to be combined at any one instance. Thus any vehicle based system will have a reactor size, and number, related to the required hydrogen for the fuel cell/power train of the vehicle.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

These and other aspects of the invention will now be described with reference to the accompanying Figures, in which:

FIG. 1: is a schematic diagram of an apparatus for carrying out an embodiment of the method of the present invention.

FIG. 2: is a schematic diagram of a reactor for carrying out the process of the present invention.

FIG. 3: shows an alternative design of a reactor for carrying out the method of the present invention where ammonia is fed through the molten metal-containing-compound.

FIGS. 4 and 5: are schematic diagrams of reactors for carrying out an embodiment of the method of the present invention.

FIG. 6: is a graph showing the conversion of flowing ammonia ($NH_3$, 60 sccm) to nitrogen ($N_2$) and hydrogen ($H_2$) as a function of temperature.

FIG. 7: is a graph showing the conversion of ammonia to hydrogen at different flow rates of ammonia at different temperatures.

FIG. 8: is a graph showing the conversion of ammonia to hydrogen at different masses of metal-containing-compound at different temperatures.

FIG. 9: is a graph showing the conversion of ammonia to hydrogen at different temperatures.

FIG. 10: is a graph comparing the conversion of ammonia to hydrogen by thermolysis (no metal-containing-compound present), by reaction with sodium amide or by reaction with lithium imide (with lithium amide precursor).

FIGS. 11, 12 and 13: are cross-sectional diagrams of a reactor for carrying out an embodiment of the present invention.

FIG. 14: is a graph comparing the conversion of ammonia to hydrogen by thermolysis (no metal-containing-compound present), by reaction with sodium amide, by reaction with lithium imide (with lithium amide precursor), or by catalysis by ruthenium or nickel.

FIG. 15: shows corresponding graphs and a chart which show the results from a neutron powder diffraction experiment on the decomposition of ammonia by lithium imide, showing a) the temperature (black) and gas flow (grey), b) the gas species used during the experiment, c) the ammonia conversion efficiency and d) a contour plot of a section of the diffraction data, showing characteristic (111) and (002) diffraction peaks for lithium imide, with the colour bar to the right indicating the intensity of the diffraction signal.

FIG. 16: is a graph showing a comparison of ammonia conversion as a function of reaction temperature (between 250° C. and 600° C.) for the blank 46.9 cm3 nickel-coated stainless steel reactor and 0.5 g of $Li_2Mg(NH)_2$, $Li_2Ca(NH)_2$, $LiNH_2$, $NaNH_2$, at an ammonia flow rate of 60 sccm.

As outlined above, FIG. 1 is a schematic diagram of an apparatus for carrying out an embodiment of the process of the present invention.

The apparatus comprises a reactor (1) containing a metal-containing-compound (2); a fuel source reservoir (3) containing ammonia (4) as a fuel. A flowline (5) connects the reservoir (3) to the reactor (1) for introducing the fuel into the reactor (1). An energy source (6) is coupled to the reactor (1) and is arranged to input energy into the reactor (1) in order to promote the reaction of ammonia (4) and metal-containing-compound (2) to form hydrogen. The apparatus also comprises a hydrogen outlet (7) from the reactor (1) for removing hydrogen from the reactor (1).

Optionally an additional flowline may be provided into reactor (1) for introducing the metal-containing-compound into the reactor (1).

FIG. 2 shows a schematic diagram of a reactor for carrying out an embodiment of the process of the present invention. In this embodiment, one or more metal-containing-compounds (260) is placed in the reactor. Ammonia gas is introduced via flowline (250). Cool nitrogen may be introduced via flowline (210) and/or (220). An energy source (270), which may be for example a furnace, heater, electromagnetic pump and/or electrochemical cell is arranged to input energy into the reactor. Metal-containing-compound vapour (240) may be produced from a molten metal-containing-compound which reacts with the ammonia to form hydrogen (230) and the metal-containing-compound is recycled to react with further ammonia. Hydrogen is removed via flowline 200. The hydrogen removed may be transferred to a mass spectrometry machine for detecting hydrogen and any ammonia present.

FIG. 3 shows an alternative design of a reactor where ammonia is fed through the molten metal-containing-compound. Such a design may be preferred as it reduces or potentially eliminates the problem of surface tarnishing of the molten metal-containing-compound. It may also simplify the reactor design. Preferably, the ammonia in-pipe has a swan neck or straight ammonia feed line that lies below the surface level of the liquid metal-containing-compound, to keep the metal-containing-compound molten within the hot zone but allow ammonia to bubble through the molten metal-containing-compound. In this embodiment one or more metal-containing-compounds (360) is placed in the reactor. Ammonia gas is introduced via flowline (350). Cool nitrogen may be introduced via flowline (310) and/or (320). An energy source (370), which may be for example a furnace, heater, electromagnetic pump and/or electrochemical cell is arranged to input energy into the reactor in order to promote the reaction of ammonia (4) and metal-containing-compound (2) to form hydrogen (330), and the metal-containing-compound is recycled to react with further ammonia. Hydrogen is removed via flowline 300. The hydrogen removed may be transferred to a mass spectrometry machine for detecting hydrogen and any ammonia present.

The key for FIG. 4 is given below:
400: To mass spec detecting $N_2$, $H_2$ and $NH_3$
405: Hot ammonia gas (Furnace temperature) Inlet
410: Cool $N_2$ in
415: 316 stainless steel
420: Metal-containing-compound comprising Li, Be, Mg, Ca, Sr, Ba
425: RT (room temperature) to 800° C., 0.1 MPa $NH_3/N_2$
430: 300 mm
435: Cu gasket
440: Thermocouple
445: Wells
450: 100 mm
455: $N_2$ and $H_2$
460: External Tube Furnace
465: 20 mm
470: Molten metal-containing-compound
475: Metal-containing-compound vapour The key for FIG. 5 is given below:
500: To mass spec detecting $N_2$, $H_2$ and $NH_3$
505: Hot ammonia gas (Furnace temperature) Inlet
510: Cool $N_2$ in 515: 316 stainless steel
520: Metal-containing-compound comprising Li, Be, Mg, Ca, Sr, Ba
525: RT to 800° C., 0.1 MPa $NH_3/N_2$
530: 300 mm
535: Cu gasket
540: Thermocouple
545: Wells
550: 100 mm
555: $N_2$ and $H_2$
560: External Tube Furnace
565: 20 mm
570: Molten metal-containing-compound
575: Metal-containing-compound vapour The key for FIG. 11 is given below:
600: Thermal Couple Housing
605: 100 CF Top Blank
610: 100 CF Furnace Vessel Flanges
615: Large Furnace Tube (258.5 mm long)
620: Long Thermal Couple Pocket (280 mm long)
625: Short Thermal Couple Pocket (70 mm long)
630: Furnace Base
635: Parker Buttweld
640: Parker Buttweld
645: Minimise Trapped Volumes
650: Flush Fit to Minimise Trapped Volumes
655: 47.0 mm
660: Φ95.0 mm
665: 250.0 mm The key for FIG. 12 is given below:
700: Details AS DN100 CF Flange
705: Details AS DN100 CF Flange
710: M8x55 Hex Bolts
715: 2 Off Welded in Thermocouple pockets for Top and Bottom Level Sensing. Internal Diameter 1.8 mm
720: Parker Hannifin ZHBW2 6½ Buttweld Connector
725: Parker Hannifin ZHBW2 4½ Buttweld Connector. 3 Off.
730: DN100 CF Copper Gasket
735: 250 mm
740: Φ95 mm
745: 5 mm
750: Φ152 mm
755: 47 mm
760: 20 mm
765: Reactor The key for FIG. 13 is given below:
800: Reactor The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The following non-limiting examples further illustrate the present invention.

EXAMPLES

Example 1

Ammonia decomposition reactions were performed in a cylindrical stainless steel (316 L) reactor with an internal volume of 46.93 cm$^3$, with a gas-in pipe running to approximately 0.5 cm from the base of the reactor, gas outlet from the lid, and a thermocouple monitoring the internal temperature at the point of gas inlet. Ammonia gas (0.1 MPa (1 bar), 99.999%) supply to the reactor was via a custom-designed gas control panel where the inlet flow was controlled using a mass flow controller (Hastings Instruments) and the outlet gas flow is measured using a mass flow meter (Hastings Instruments); the flow is recorded in standard cubic centimetres per minute (sccm). The gas species leaving the reactor were characterised using a Hiden Analytical HPR-20 R&D Mass Spectrometer System.

The solid sample was loaded into a reactor under an argon atmosphere. The reactor was then sealed and transferred to a standard upright furnace and connected to the gas control panel. The panel and reactor were first flushed with argon, then ammonia, prior to heating. Decomposition experiments were performed under 1 bar of flowing ammonia, at flow rates set by the mass flow controller. The percentage conversion of ammonia is calculated by expressing the $NH_3$ signal as a percentage of the sum of the partial pressures for $NH_3$, $H_2$ and $N_2$ (corrected for baseline levels). The percentage conversion of ammonia is then calculated as 100% minus the calculated ammonia percentage.

Figure 1:
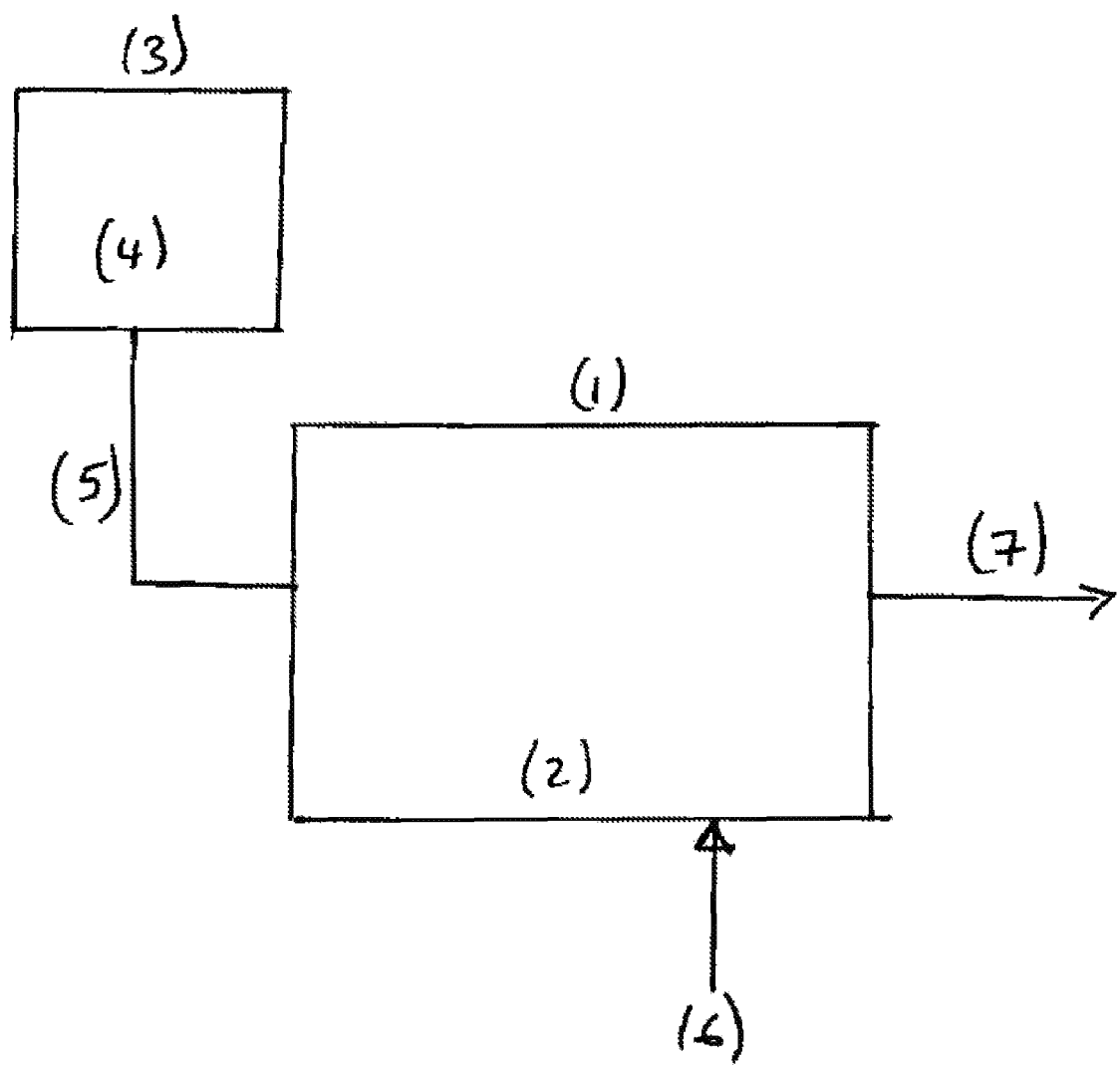
Figure 2:
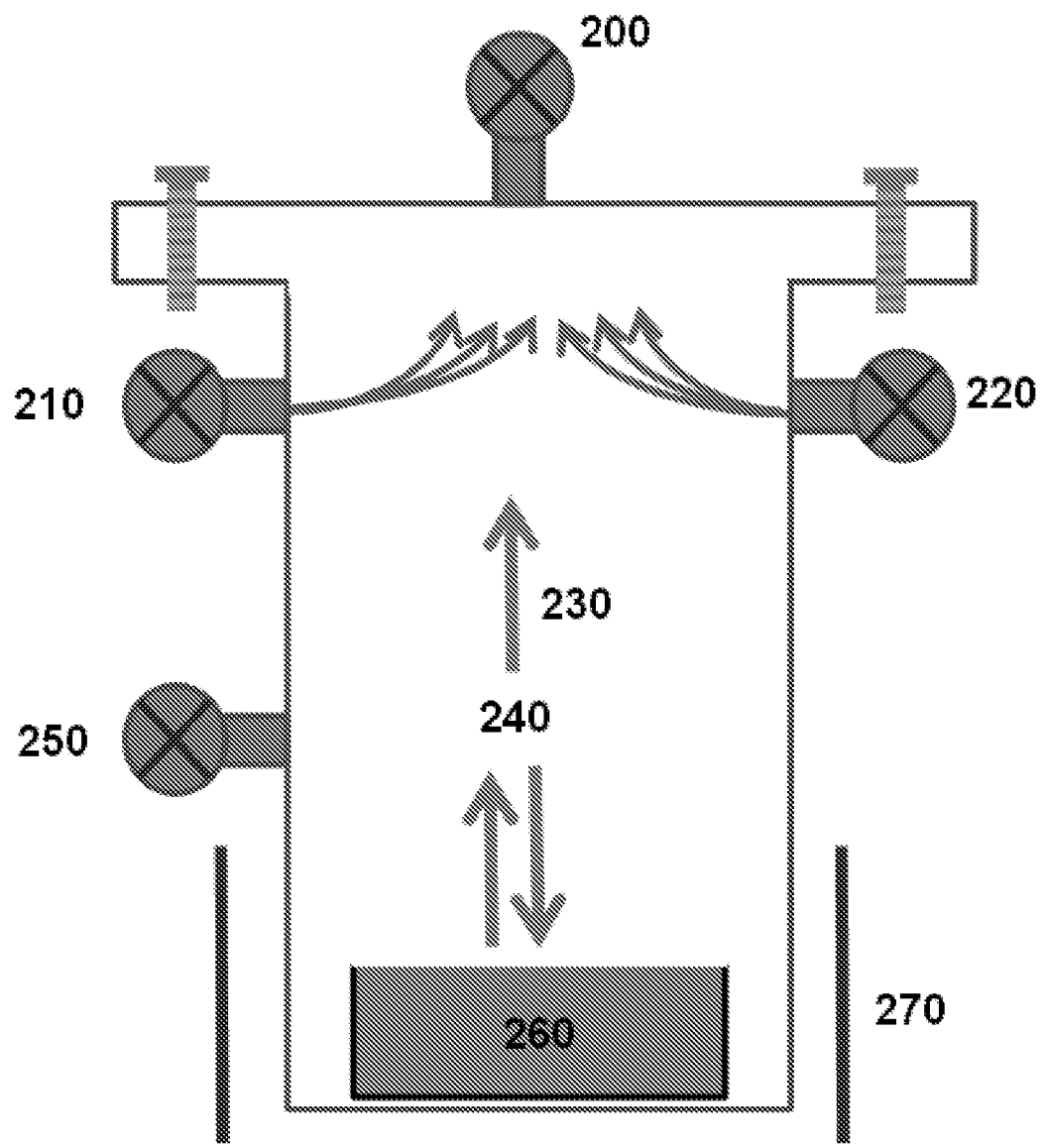
Figure 3:
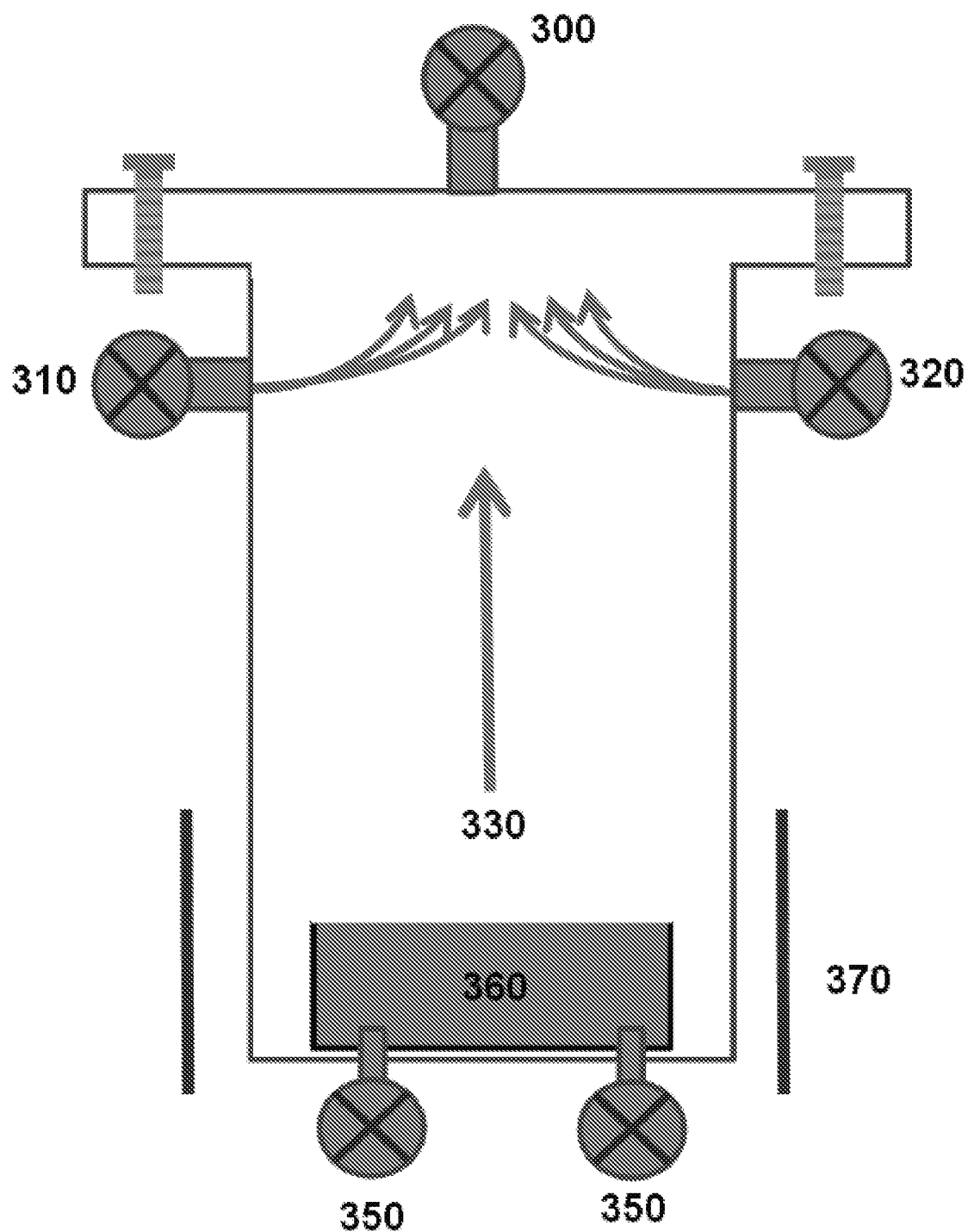
Figure 4:
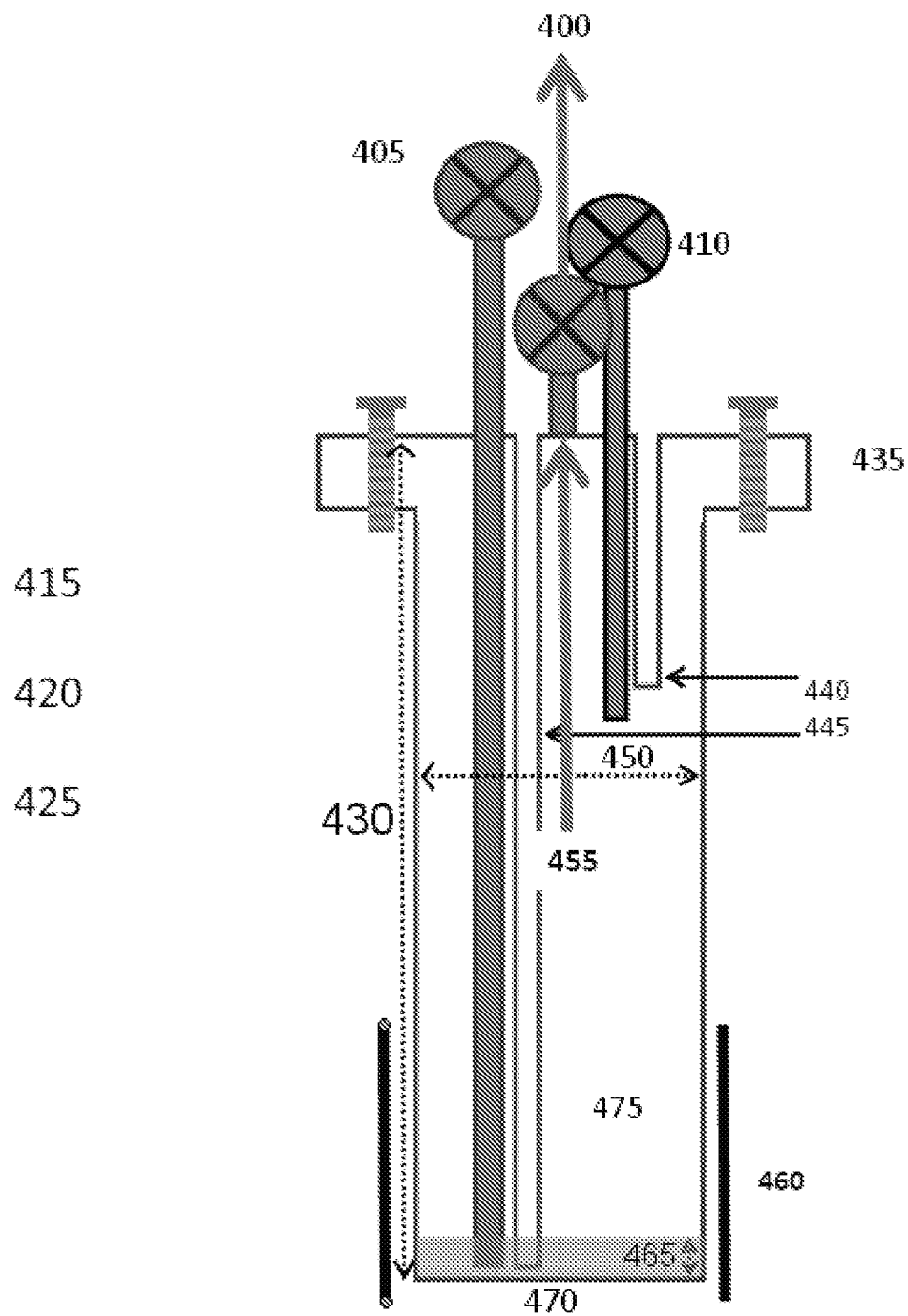
Figure 5:
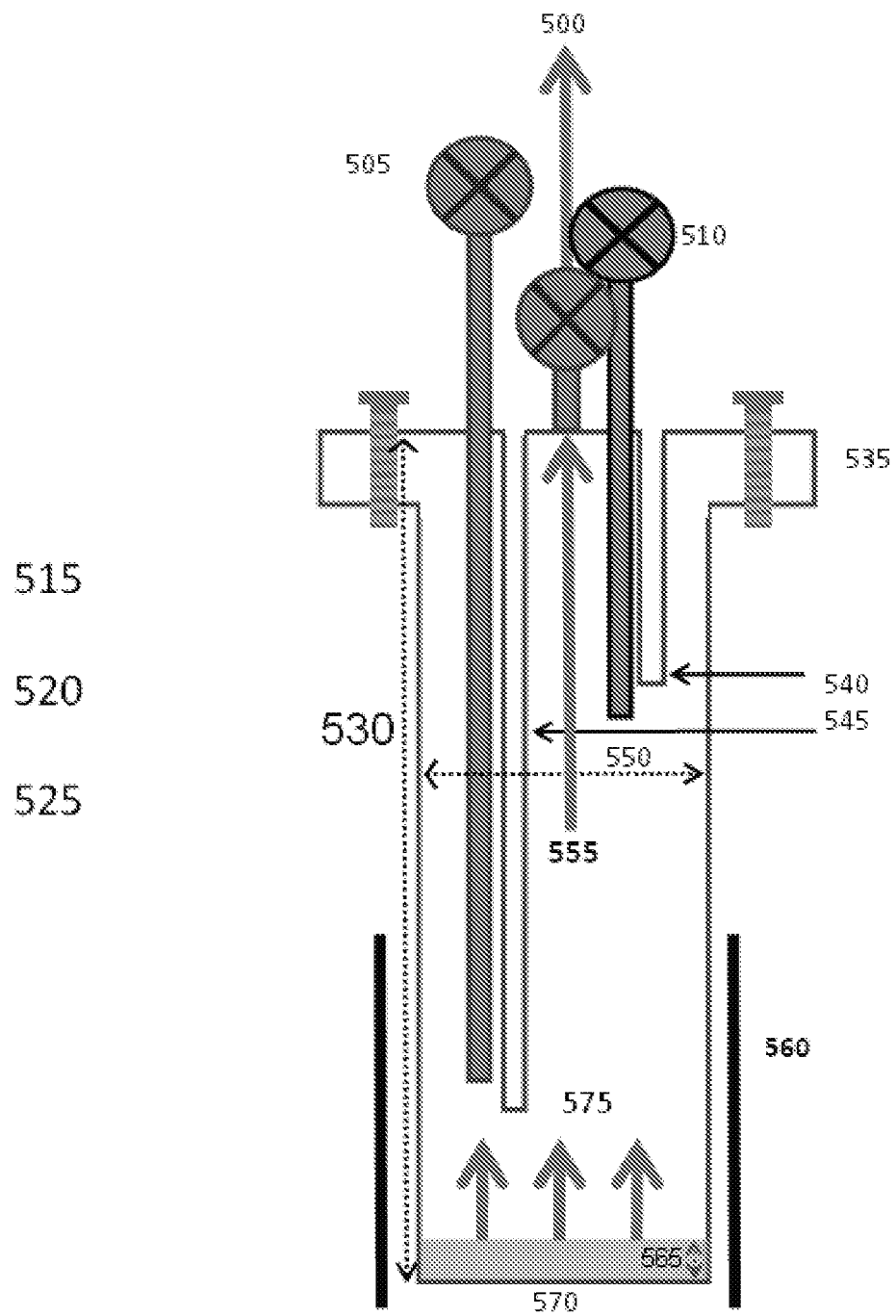
Figure 6:
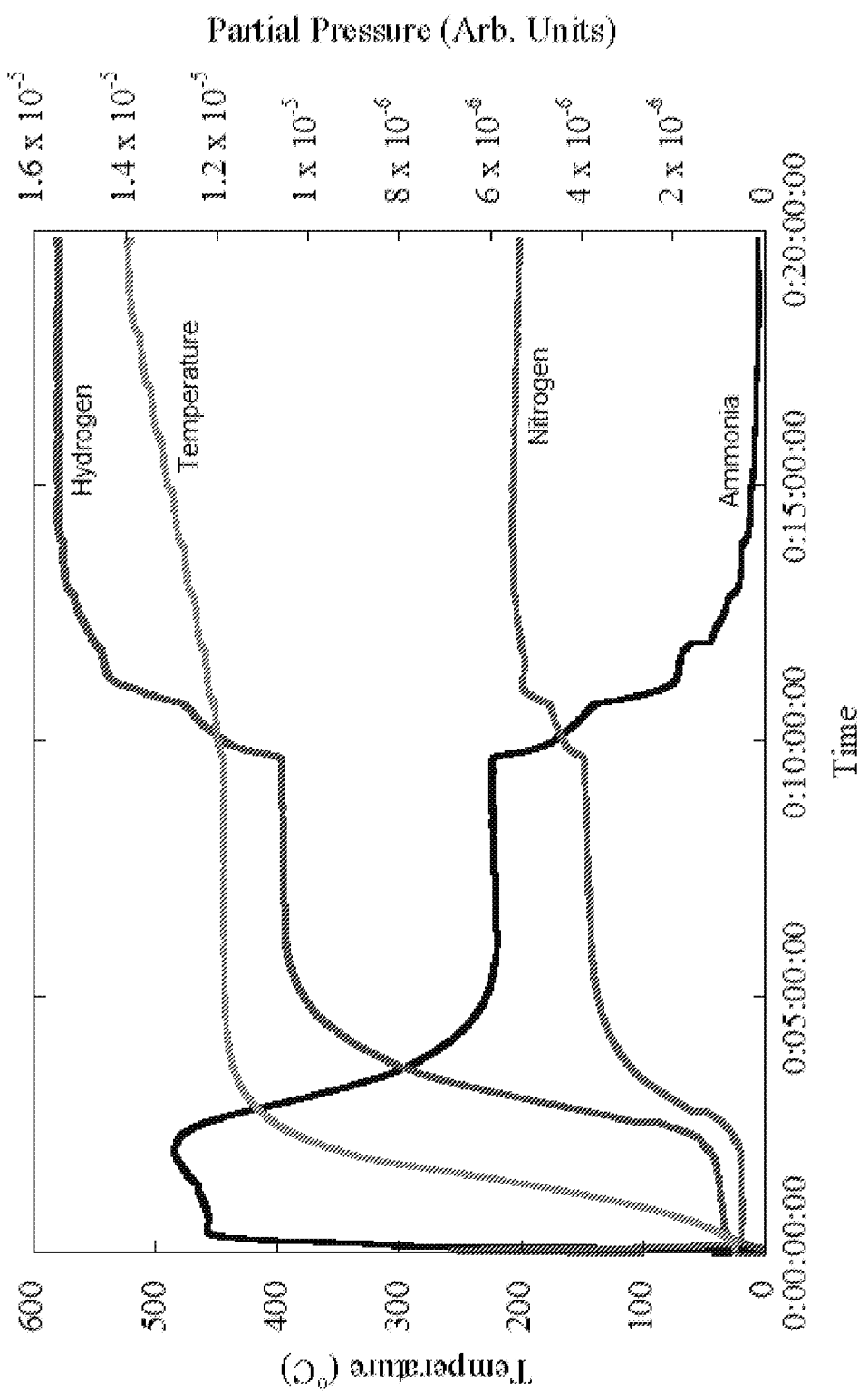
FIG. 6 shows mass spectroscopy data showing that at all temperatures the amide/imide converts the flowing ammonia to nitrogen and hydrogen. Above 320° C. the conversion becomes very rapid and reaches ~100% efficiency at approximately 480° C.
Figure 7:
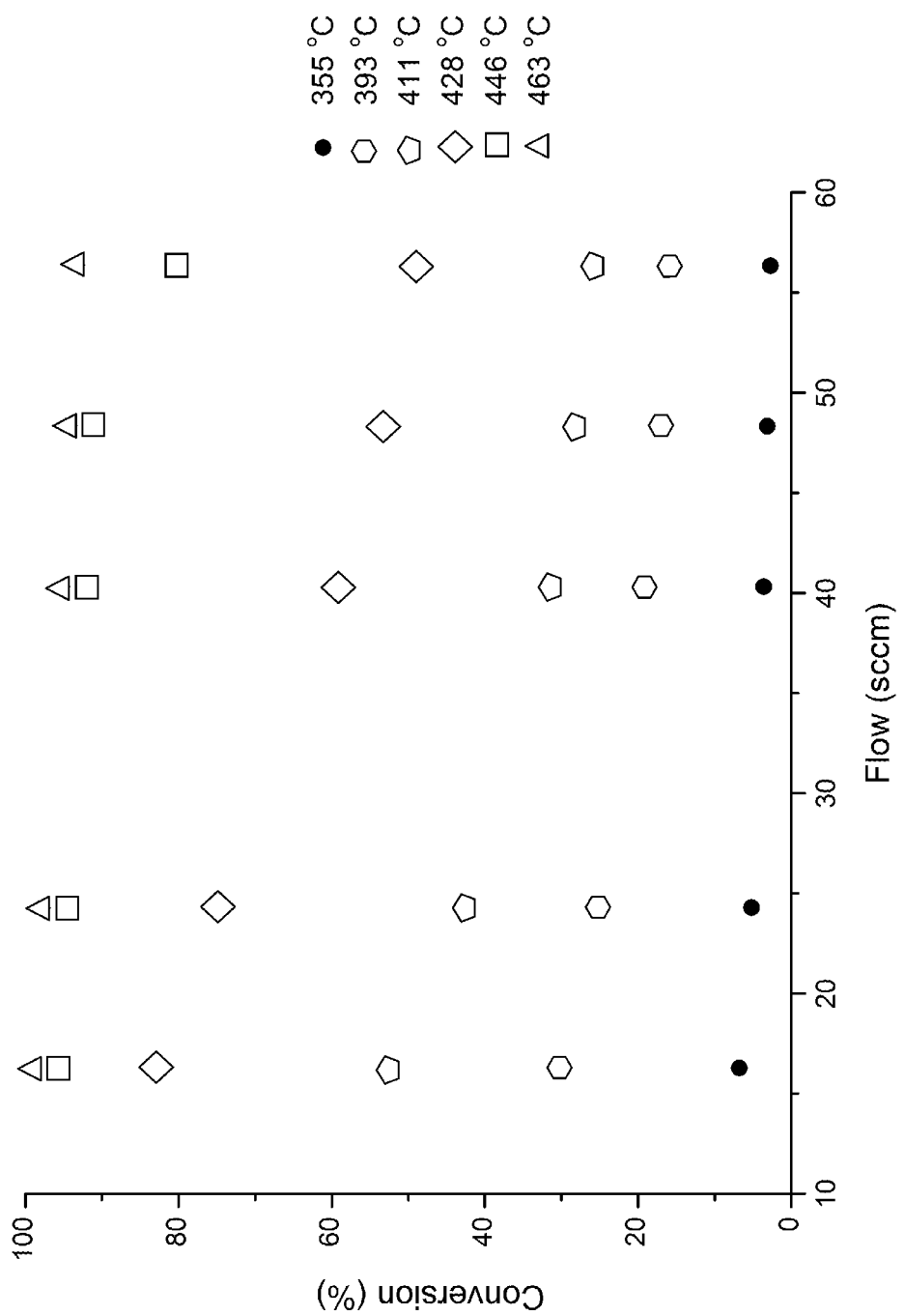
FIG. 7 shows the variable-flow ammonia decomposition performance for six temperatures, using 0.5 g of lithium amide and 0.1 MPa (1 bar) of ammonia.
Figure 8:
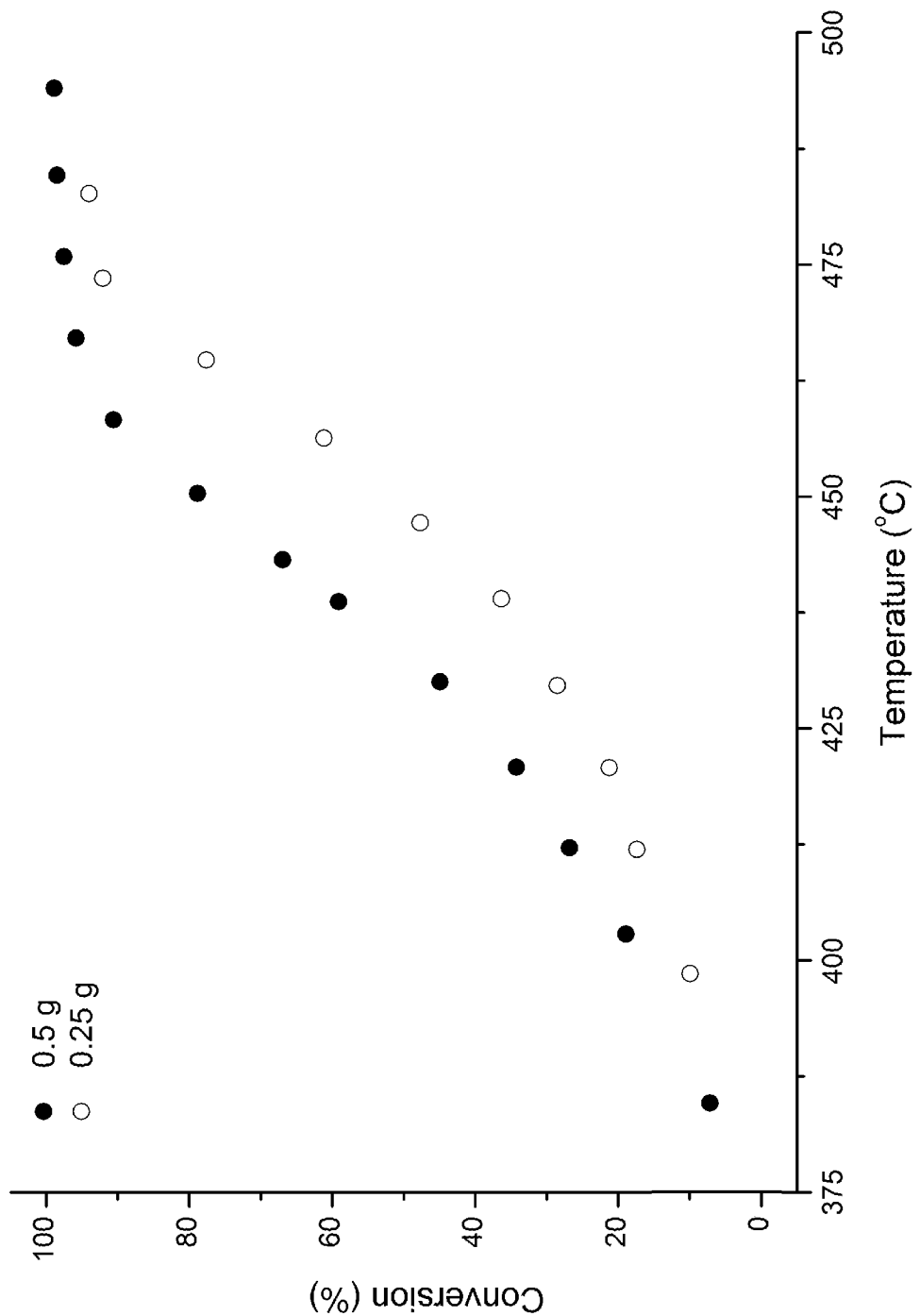
FIG. 8 shows a comparison of the variable-temperature ammonia decomposition performance for different starting masses of lithium amide, under 60 sccm ammonia flow at 0.1 MPa (1 bar).
Figure 9:
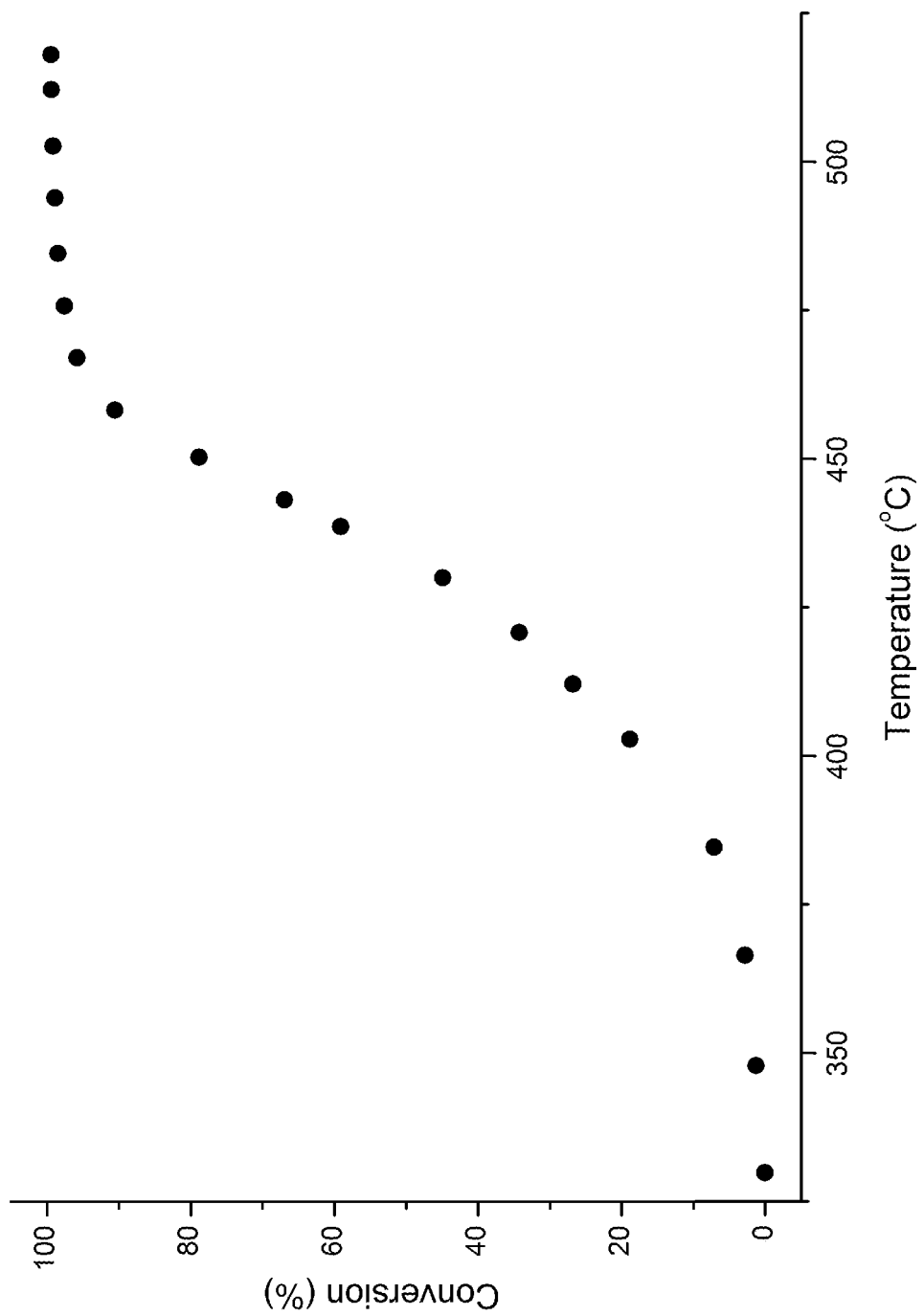

FIG. 9 shows the variation in percentage ammonia decomposition with temperature for 0.5 g lithium amide under 60 sccm of ammonia flow at 0.1 MPa (1 bar). The system was allowed to equilibrate at each temperature for 2 hours.

Figure 10:
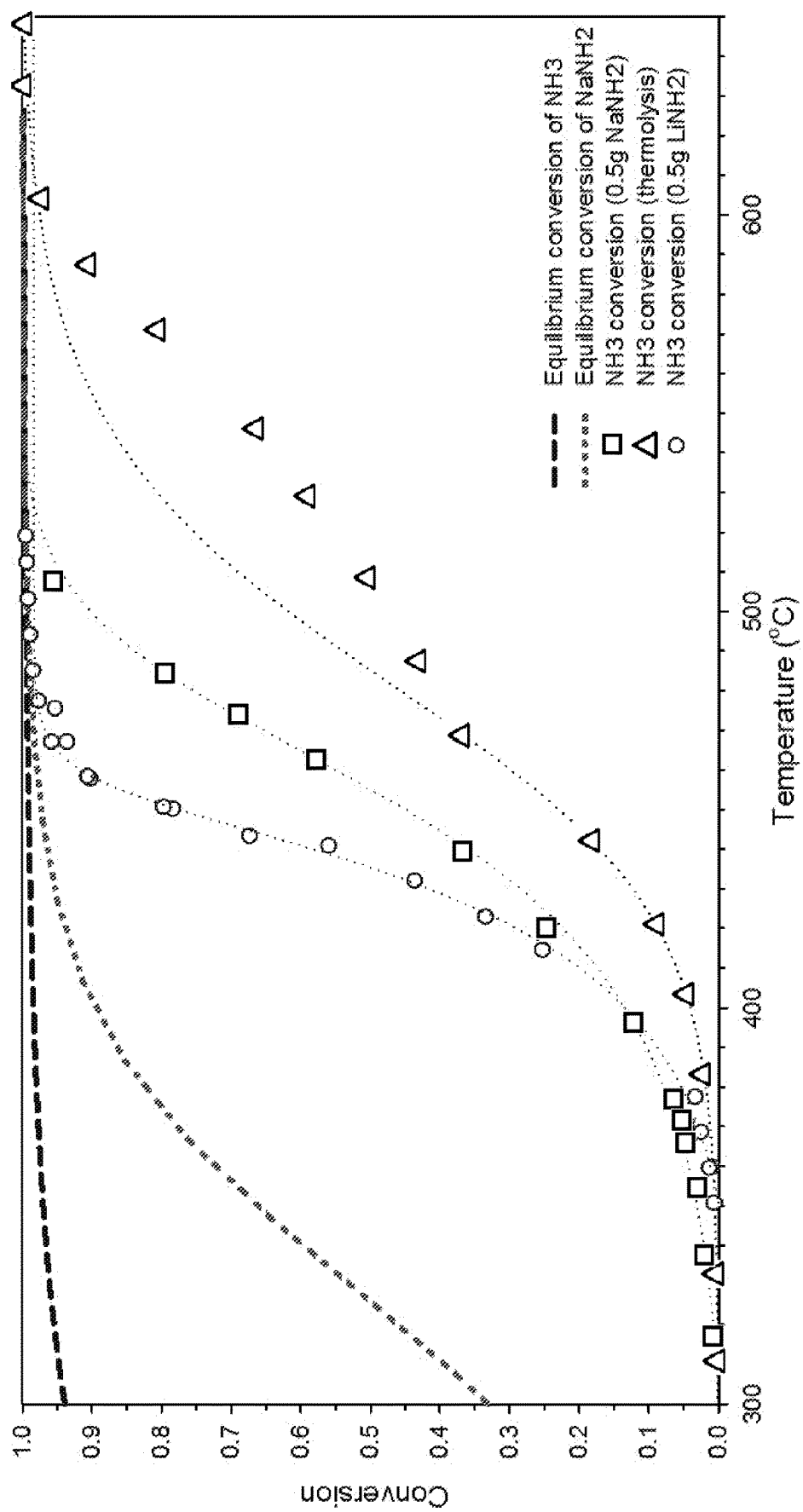
Figure 11:
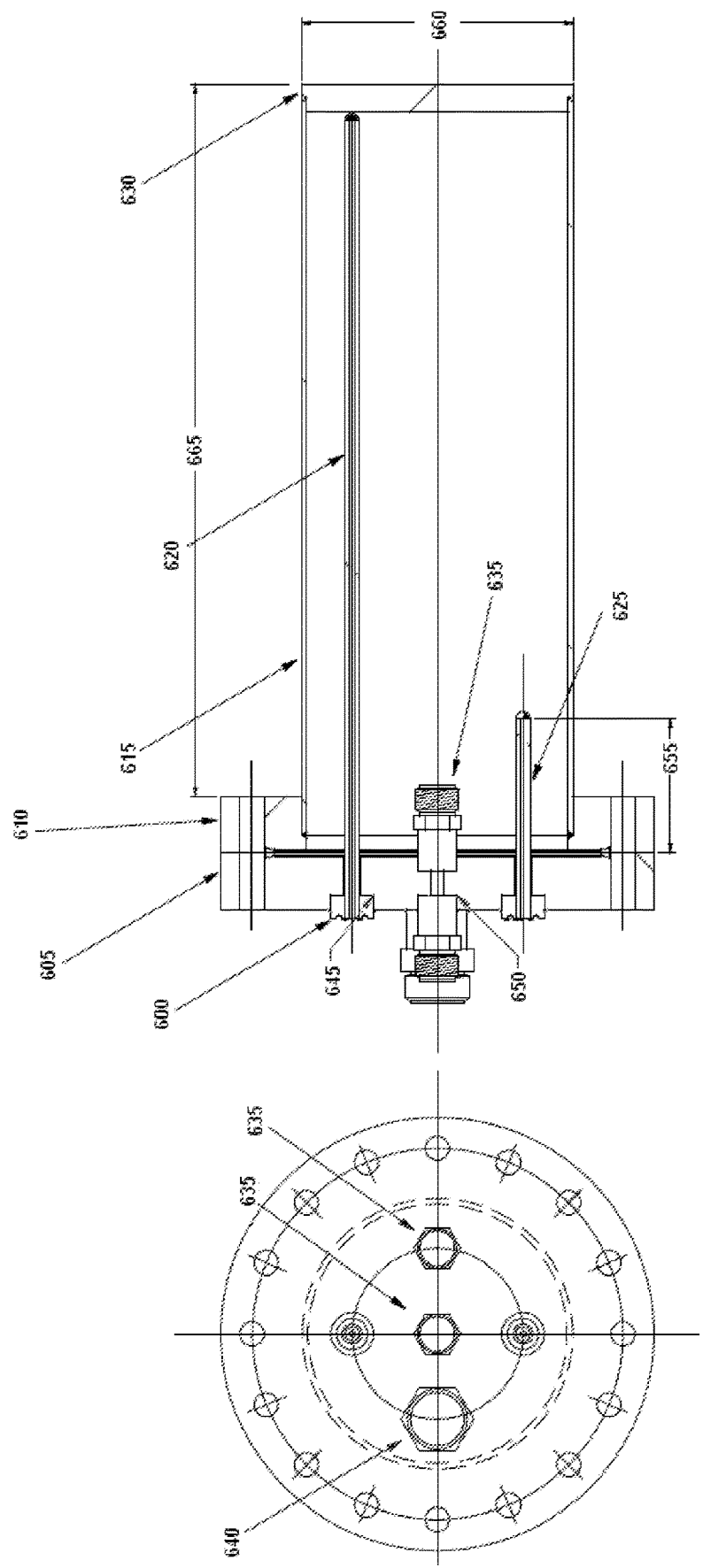
Figure 13:
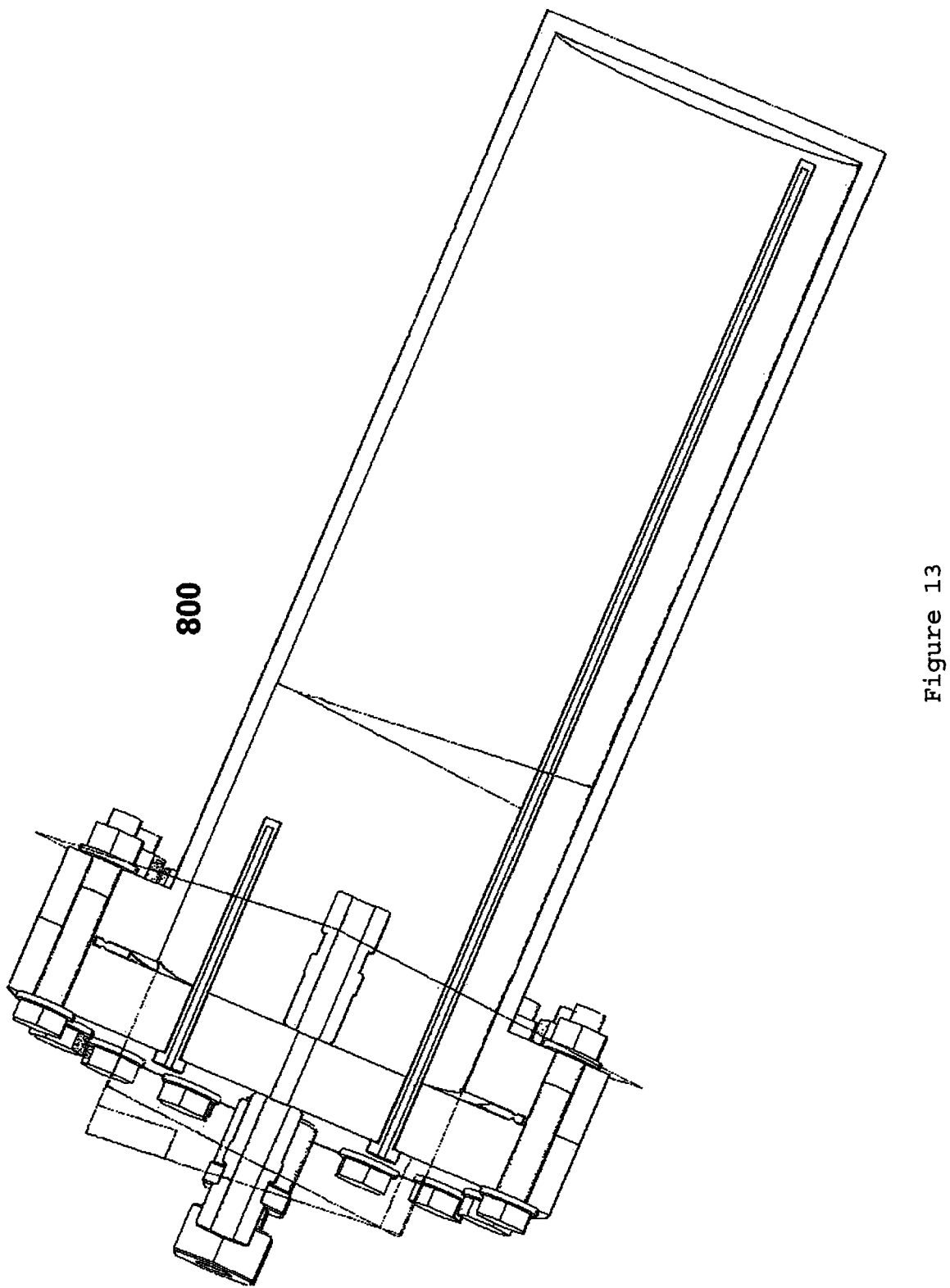

FIG. 10 shows the variation in percentage ammonia decomposition with temperature for 0.5 g sodium amide, 0.5 g lithium amide (precursor of lithium imide) and an empty reactor (thermolysis). These data are compared with the theoretical conversion values calculated using the standard thermodynamic parameters for the decomposition of ammonia/sodium amide. FIG. 10 shows that ammonia decomposes to produce hydrogen in the presence of lithium amide/imide at a lower temperature than in the presence of sodium amide.

Example 2

Figure 14:
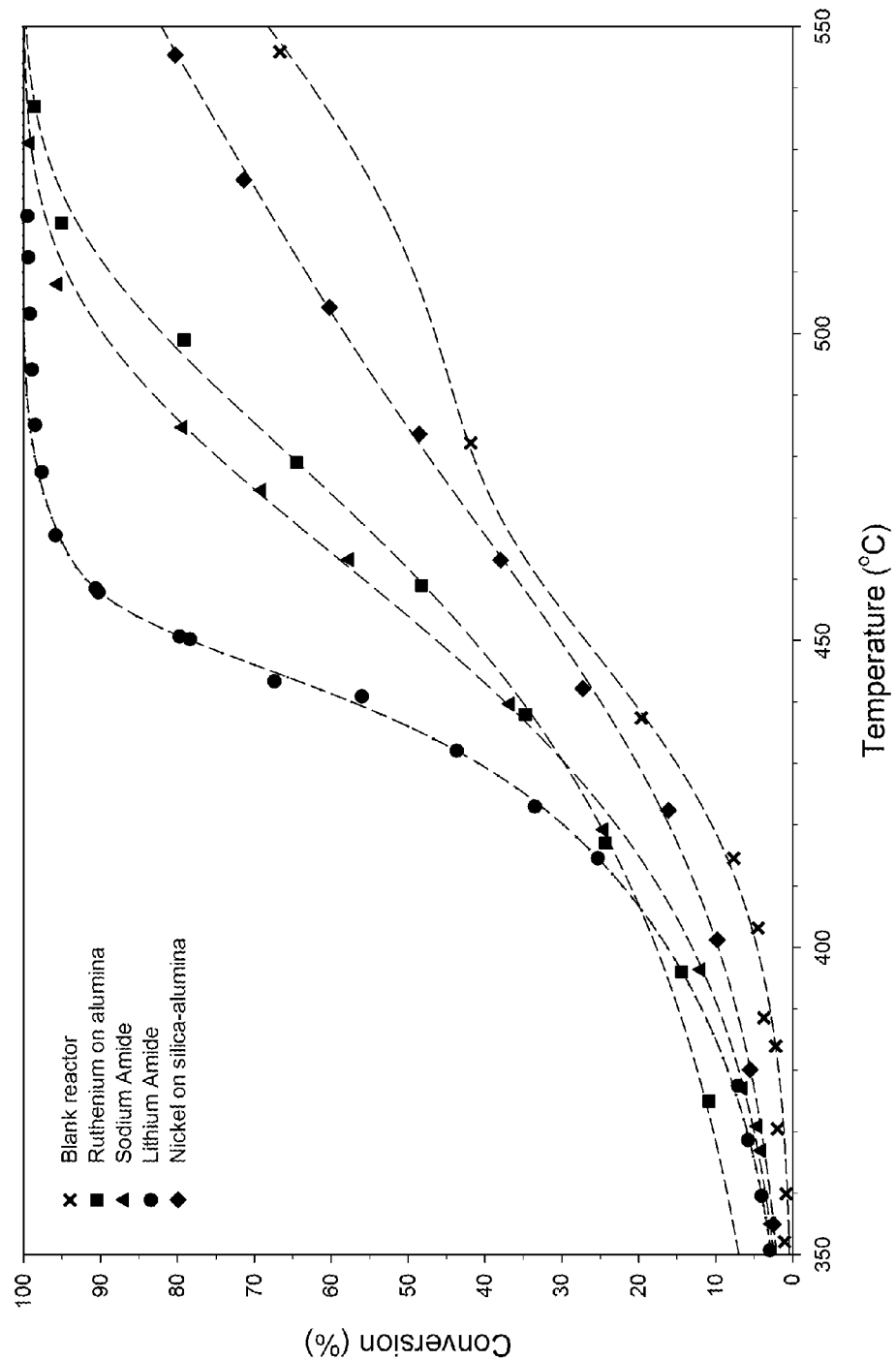

The ammonia decomposition activity of lithium amide/imide was tested in an identical manner to that described in Example 1, with flowing ammonia gas passing over the amide/imide in a stainless steel "Dreschel bottle" design. The variable-temperature ammonia decomposition efficiency of 0.5 g lithium amide compared with an equivalent mass of sodium amide, supported nickel and ruthenium catalysts, and the empty reactor is shown in FIG. 14. The ammonia flow rate was constant at 60 sccm for all of the samples. Lithium amide/imide gives high conversion at moderate temperatures, reaching 90.7% conversion at 458° C., compared with 54.9% for sodium amide, 53.7% for ruthenium on alumina, and 34.0% for the blank reactor. At low temperatures, sodium amide and ruthenium catalyst show superior performance. However, lithium amide/imide shows a steeper conversion curve than the other systems in FIG. 14. It is clear that lithium amide displays superior ammonia decomposition activity (high conversion) at higher temperatures.

Figure 15:
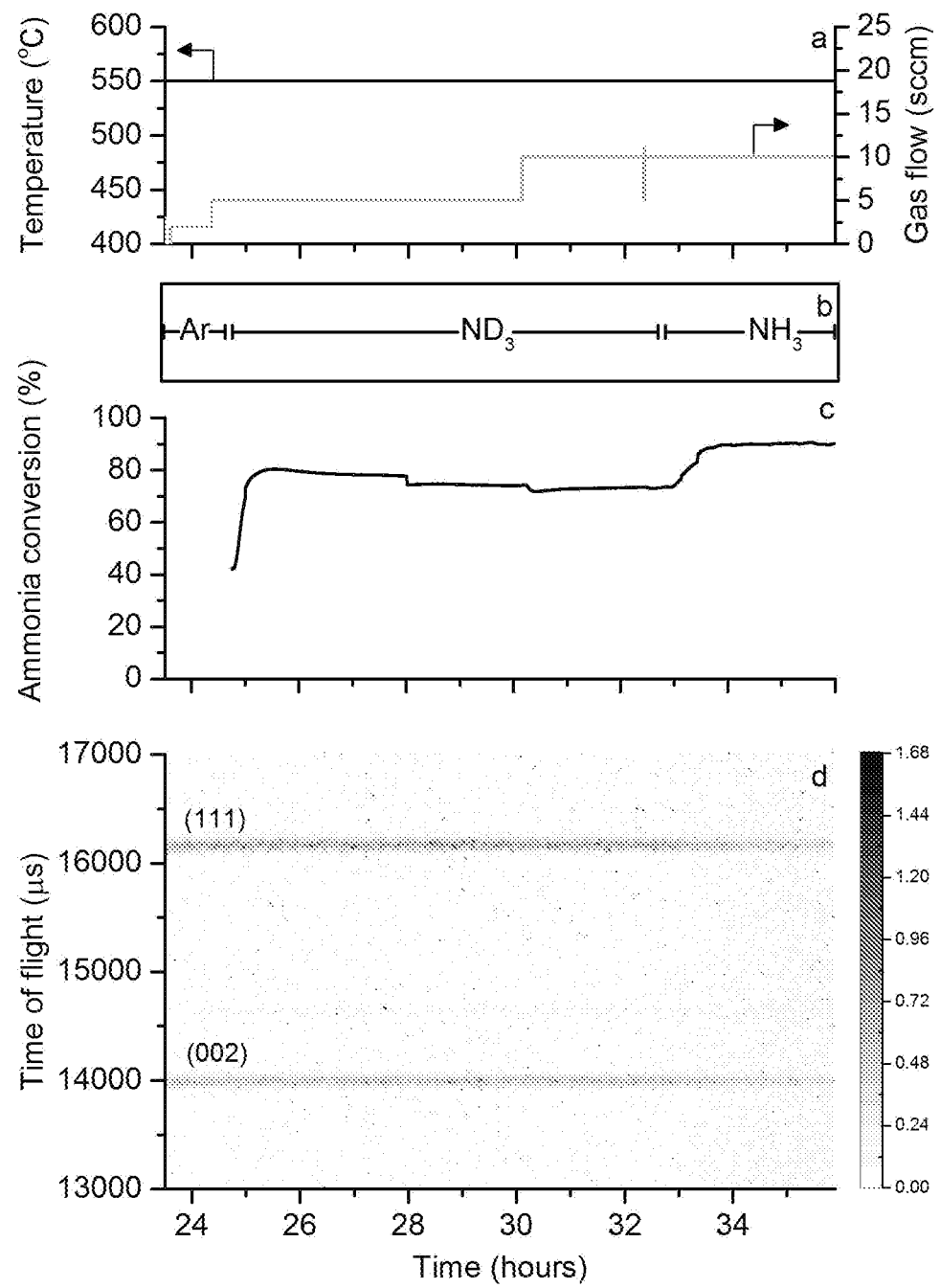

The superior properties of the lithium amide/imide may be attributable to the reaction mechanism. This was investigated and a summary of the results shown in FIG. 15. FIG. 15 shows a section of Neutron Powder Diffraction (NPD) data showing the (111) and (002) reflections of $Li_2ND$, along with the temperature, gas flow, input gas species and the ammonia conversion efficiency over the course of the reaction. At 550° C., the sample remains crystalline throughout the ammonia decomposition experiment. The ammonia conversion efficiency was around 75%, compared with 39% using the same reaction conditions with the blank sample cell. Clearly the sample was involved in the enhanced decomposition of the ammonia in this experiment. Interestingly, the efficiencies for both the empty reactor and the catalyst are lower than those presented in FIG. 14. This may be as a result of the different geometry of the reaction zone and/or the difference in the reaction kinetics between using $NH_3$ or $ND_3$.

The lithium amide/imide system is thought to form a continuum of non-stoichiometric intermediates $(Li_{(1+x)}NH_{(2-x)}, 0 \leq x \leq 1)$ which have the same average cubic structure as high-temperature lithium imide, but with an increased cubic lattice parameter as the stoichiometry approaches that of lithium amide. Therefore, the lattice parameter is a good guide to the stoichiometry of the sample when measured under isothermal conditions. As the temperature of the ammonia decomposition reaction is lowered, the stoichiometry of the sample moves towards more amide-like stoichiometry. As this occurs, the sample will eventually melt. However, as shown by FIG. 15, at higher temperatures, lithium imide remains solid while decomposing ammonia.

From the perspective of practicality, the ability to keep the metal-containing-compound solid at high temperatures has important implications, potentially giving a lithium-based amide/imide an additional advantage over the sodium system, along with the higher conversion efficiency. Working with a solid metal-containing-compound may allow for traditional methods used in catalysis to be applied in order to achieve higher turnover frequency, e.g. nanosizing and complex support structures. The task of containing the metal-containing-compound is also significantly simpler.

For instance, a typical experimental run with sodium amide (99.75% conversion, 600° C., 100 sccm $NH_3$) results in material recoveries as low as 0.1%, as the sodium amide ends up coating the reactor and outlet tubing with a fine coating of powder. In contrast, lithium imide, which is heated to 500° C. under argon before switching to ammonia in order to avoid amide formation, shows material recoveries in excess of 80% after similar reaction conditions (99.85% conversion, 590° C., 100 sccm $NH_3$).

Example 3

Lithium magnesium imide $(Li_2Mg(NH)_2)$ and lithium calcium imide $(Li_2Ca(NH)_2)$ were formed by the reaction of lithium amide and the magnesium/calcium hydride:

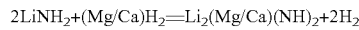

Figure 16:
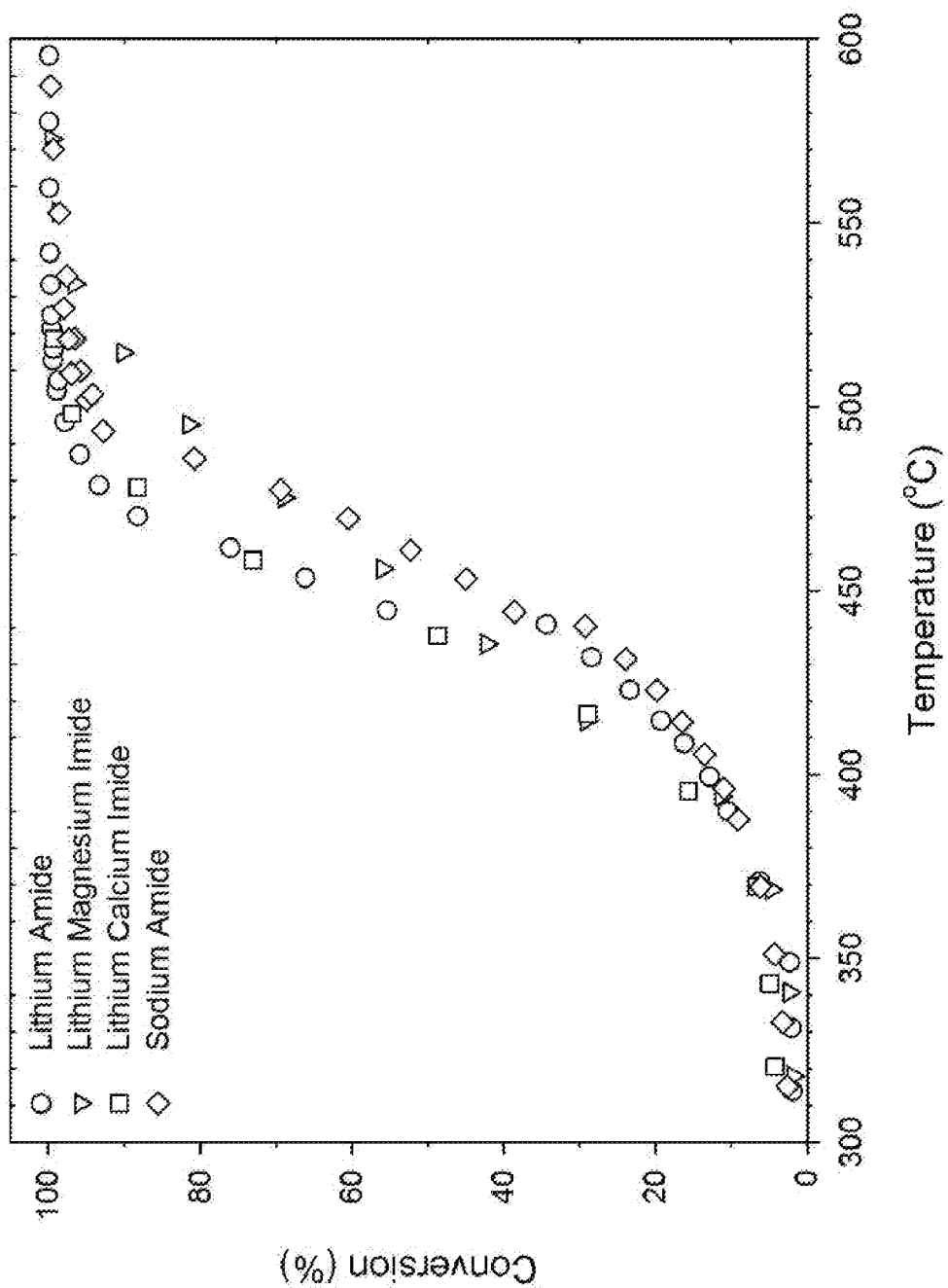

The variable-temperature ammonia decomposition efficiency of 0.5 g of the lithium-calcium and lithium-magnesium imides were tested in the same manner as that described for each of Examples 1 and 2. The results are shown in FIG. 16 and show that the performance of both ternary imides is superior at low temperatures compared to sodium amide. Above 430° C. the lithium-calcium imide tracks the performance of lithium amide-imide quite closely.

The recovery of the lithium-calcium imide was almost quantitative (96%). This is significant in light of the fact that the decomposition performance was equivalent to lithium amide-imide, making it particularly advantageous.

The results indicate that calcium imide is also likely to show good ammonia decomposition performance.

The invention claimed is:

1. A method of producing hydrogen from ammonia, the method comprising:
   (i) providing ammonia as a fuel source;
   (ii) introducing ammonia into a reactor;
   (iii) contacting at least some of the ammonia in the reactor with a metal-containing-compound to form hydrogen;
   (iv) removing at least some of the hydrogen formed in step (iii); and
   (v) contacting the metal-containing-compound with further ammonia;
   wherein the metal-containing-compound comprises one or more of Li, Be, Mg, Ca, Sr, Ba or alloys or mixtures of two or more thereof;
   wherein the metal-containing-compound is selected from a metal amide, metal imide, metal nitride or combinations thereof; and
   wherein the metal-containing-compound is regenerated prior to step (v).

2. The method according to claim 1, wherein the metal-containing-compound comprises one or more of Li, Be, Ca, Sr, Ba or alloys or mixtures of two or more thereof.

3. The method according to claim 1, wherein the metal-containing-compound comprises Li or alloys thereof.

4. The method of claim 1, wherein the metal-containing-compound comprises Be, Mg, Ca, Sr, Ba or alloys or mixtures of two or more thereof.

5. The method of claim 4, wherein the metal-containing-compound comprises Ca, Mg or alloys or mixtures of two or more thereof.

6. The method according to claim 1, wherein the metal-containing-compound is selected from a metal imide or metal nitride or combinations thereof.

7. The method according to claim 3, wherein the metal-containing-compound is a metal imide.

8. The method according to claim 1, wherein the metal-containing-compound comprises Li; and the metal-containing-compound is selected from a metal imide or metal nitride or combinations thereof.

9. The method according to claim 1, wherein the metal-containing-compound is provided by thermally decomposing a metal-containing-compound precursor.

10. The method according to claim 9, wherein the metal-containing-compound precursor is a metal amide.

11. The method according to claim 1, wherein step (iii) is carried out at a temperature in the range of from −30 to 800° C.

12. The method according to claim 1, wherein step (iii) is carried out at a temperature in the range of from 400 to 440° C.

13. The method according to claim 1, wherein step (iii) is carried out at a pressure in the range of from 0.05 to 20 MPa.

14. The method according to claim 1, wherein step (iii) is carried out at a pressure in the range of from 0.1 to 0.2 MPa.

15. The method according to claim 1, wherein ammonia is introduced into the reactor at a temperature in the range of from −30 to 800° C.

16. The method according to claim 1, wherein ammonia is introduced into the reactor at a temperature in the range of from 400 to 440° C.

17. The method according to claim 1, wherein ammonia is introduced into the reactor at a pressure in the range of from 0.05 to 20 MPa.

18. The method according to claim 1, wherein ammonia is introduced into the reactor at a pressure in the range of from 0.1 to 0.2 MPa.

19. The method according to claim 1, wherein the molar ratio of metal-containing-compound to ammonia is in the range of from 1:1 to 2:1.

20. The method according to claim 1 wherein the method is carried out in-situ in a vehicle.

21. The method according to claim 1, further comprising introducing the removed hydrogen into a fuel cell or a prime mover.

22. The method according to claim 1, further comprising combusting the removed hydrogen.

23. The method according to claim 1, wherein the ammonia is in a gaseous and/or liquid state.

24. The method according to claim 1, wherein ammonia is introduced into the reactor by injection, pumping, spraying and/or by mechanical means.

25. The method according to claim 1, further comprising refuelling the ammonia fuel source.

26. The method according to claim 1, wherein the metal-containing-compound is in the faun of a solid, liquid or dispersed form.

27. The method according to claim 1, wherein step (iii) is carried out in the absence of a catalyst.

28. The method according to claim 1, wherein step (iii) is carried out in the presence of a catalyst.

29. The method according to claim 28, wherein the catalyst comprises one or more transition metals, lanthanide metals and mixtures thereof.

30. The method according to claim 29, wherein the catalyst is selected from the group consisting of transition metal calogenides, lanthanide metal calogenides, transition metal halides, lanthanide metal halides, transition metal pnictides, lanthanide metal pnictides, transition metal tetrels, lanthanide metal tetrels and mixtures of two or more thereof.

31. The method according to claim 1, wherein the metal-containing-compound and/or a precursor thereof is introduced into the reactor.

32. The method according to claim 31, wherein the metal-containing-compound and/or a precursor thereof is introduced into the reactor by pumping (preferably electromotively), spraying, or is mechanically introduced.

33. The method according to claim 1, further comprising removing hydrogen formed by the contacting of ammonia with the metal-containing-compound from the reactor.

34. The method according to claim 1, wherein the metal imide includes stoichiometric and/or non-stoichiometric imides of the formula $M(3-a)NH_a$ where $1 \leq a < 2$ when M is Li and of the formula $M(NH_b)_b$ where $1 \leq b < 2$ when M is one or more of Be, Mg, Ca, Sr, Ba.

* * * * *